US011635758B2

(12) United States Patent
Wray et al.

(10) Patent No.: US 11,635,758 B2
(45) Date of Patent: Apr. 25, 2023

(54) RISK AWARE EXECUTOR WITH ACTION SET RECOMMENDATIONS

(71) Applicants: Nissan North America, Inc., Franklin, TN (US); The University of Massachusetts, Boston, MA (US); Renault S.A.S., Boulogne-Billancourt (FR)

(72) Inventors: Kyle Hollins Wray, Fremont, CA (US); Stefan Witwicki, San Carlos, CA (US); Shlomo Zilberstein, Amherst, MA (US)

(73) Assignees: Nissan North America, Inc., Franklin, TN (US); The University of Massachusetts, Boston, MA (US); Renault S.A.S., Boulogne-Billancourt (FR)

( * ) Notice: Subject to any disclaimer, the term of this patent is extended or adjusted under 35 U.S.C. 154(b) by 262 days.

(21) Appl. No.: 16/696,235

(22) Filed: Nov. 26, 2019

(65) Prior Publication Data
US 2021/0157315 A1 May 27, 2021

(51) Int. Cl.
*G05D 1/00* (2006.01)
*G01C 21/34* (2006.01)
(Continued)

(52) U.S. Cl.
CPC ....... *G05D 1/0088* (2013.01); *G01C 21/3492* (2013.01); *G05D 1/0212* (2013.01); *G06N 7/005* (2013.01); *G05D 2201/0212* (2013.01)

(58) Field of Classification Search
CPC .............. G05D 1/0088; G05D 1/0212; G05D 2201/0212; G01C 21/3492; G06N 7/005
See application file for complete search history.

(56) References Cited

U.S. PATENT DOCUMENTS

| 4,751,570 A | 6/1988 | Robinson |
| 5,615,116 A | 3/1997 | Gudat et al. |
| (Continued) | | |

FOREIGN PATENT DOCUMENTS

| CN | 103945486 A | 7/2014 |
| CN | 105216795 A | 1/2016 |
| (Continued) | | |

OTHER PUBLICATIONS

Brechtel et al., Probabilistic Decision-Making Under Uncertainty for Autonomous Driving Using Continuous POMPDs, 2014 IEEE 17th International Conference on Intelligent Transportation Systems, Oct. 8-11, 2014; pp. 392-399.

(Continued)

*Primary Examiner* — Vivek D Koppikar
*Assistant Examiner* — Dominick Mulder
(74) *Attorney, Agent, or Firm* — Young Basile Hanlon & MacFarlane, P.C.

(57) ABSTRACT

A method for use in traversing a vehicle transportation network by an autonomous vehicle (AV) includes traversing, by the AV, the vehicle transportation network. Traversing the vehicle transportation network includes identifying a distinct vehicle operational scenario; instantiating a first decision component instance; receiving a first set of candidate vehicle control actions from the first decision component instance; selecting an action; and controlling the AV to traverse a portion of the vehicle transportation network based on the action. The first decision component instance is an instance of a first decision component modeling the distinct vehicle operational scenario.

17 Claims, 9 Drawing Sheets

(51) Int. Cl.
*G06N 7/00* (2023.01)
*G05D 1/02* (2020.01)

(56) References Cited

U.S. PATENT DOCUMENTS

| | | |
|---|---|---|
| 8,762,006 B2 | 6/2014 | Miller |
| 8,781,669 B1 | 7/2014 | Teller et al. |
| 8,849,483 B2 | 9/2014 | Kuwata et al. |
| 8,884,782 B2 | 11/2014 | Rubin et al. |
| 9,081,651 B2 | 7/2015 | Filev et al. |
| 9,103,671 B1 | 8/2015 | Breed et al. |
| 9,134,731 B2 | 9/2015 | Healey et al. |
| 9,494,439 B1 | 11/2016 | Ross et al. |
| 9,568,915 B1 | 2/2017 | Berntorp et al. |
| 9,646,428 B1 | 5/2017 | Konrardy et al. |
| 9,972,054 B1 | 5/2018 | Konrardy et al. |
| 10,029,701 B2 | 7/2018 | Gordon et al. |
| 10,061,326 B2 | 8/2018 | Gordon et al. |
| 10,093,322 B2 | 10/2018 | Gordon et al. |
| 10,126,135 B2 | 11/2018 | Mortazavi et al. |
| 10,185,998 B1 | 1/2019 | Konrardy et al. |
| 10,319,039 B1 | 6/2019 | Konrardy et al. |
| 10,371,130 B2 | 8/2019 | Deng et al. |
| 10,380,886 B2 | 8/2019 | Ran et al. |
| 10,408,638 B2 | 9/2019 | Berntorp et al. |
| 10,514,705 B2 | 12/2019 | Shalev-Shwartz et al. |
| 10,518,764 B2 | 12/2019 | Cao et al. |
| 10,538,252 B2 | 1/2020 | Ebina et al. |
| 10,599,155 B1 | 3/2020 | Konrardy et al. |
| 10,990,096 B2 | 4/2021 | Isele et al. |
| 11,037,320 B1 | 6/2021 | Ebrahimi Afrouzi et al. |
| 2004/0068351 A1 | 4/2004 | Solomon |
| 2005/0057370 A1 | 3/2005 | Warrior et al. |
| 2007/0021915 A1 | 1/2007 | Breed et al. |
| 2007/0168096 A1 | 7/2007 | Boutin |
| 2008/0097699 A1 | 4/2008 | Ono |
| 2009/0088916 A1 | 4/2009 | Elgersma et al. |
| 2009/0140887 A1 | 6/2009 | Breed et al. |
| 2009/0299496 A1 | 12/2009 | Cade |
| 2009/0326819 A1 | 12/2009 | Taguchi |
| 2010/0223216 A1 | 9/2010 | Eggert et al. |
| 2011/0016067 A1 | 1/2011 | Levchuk et al. |
| 2011/0102195 A1 | 5/2011 | Kushi et al. |
| 2012/0150437 A1 | 6/2012 | Zeng et al. |
| 2012/0233102 A1 | 9/2012 | James |
| 2012/0290152 A1 | 11/2012 | Cheung et al. |
| 2013/0318023 A1 | 11/2013 | Morimura et al. |
| 2014/0067483 A1 | 3/2014 | Jeong et al. |
| 2014/0136414 A1 | 5/2014 | Abhyanker |
| 2014/0222277 A1 | 8/2014 | Tsimhoni et al. |
| 2014/0244114 A1 | 8/2014 | Matsubara |
| 2014/0309838 A1 | 10/2014 | Ricci |
| 2015/0039157 A1 | 2/2015 | Wolfe et al. |
| 2015/0070156 A1 | 3/2015 | Milburn, Jr. |
| 2015/0081156 A1 | 3/2015 | Trepagnier et al. |
| 2015/0105961 A1 | 4/2015 | Callow |
| 2015/0106010 A1 | 4/2015 | Martin et al. |
| 2015/0153735 A1 | 6/2015 | Clarke et al. |
| 2015/0183431 A1 | 7/2015 | Nanami |
| 2015/0210274 A1 | 7/2015 | Clarke et al. |
| 2015/0253772 A1 | 9/2015 | Solyom et al. |
| 2015/0329130 A1 | 11/2015 | Carlson et al. |
| 2015/0345966 A1 | 12/2015 | Meuleau |
| 2015/0345967 A1 | 12/2015 | Meuleau |
| 2015/0370228 A1* | 12/2015 | Kohn .............. G06N 5/04 700/287 |
| 2015/0375748 A1 | 12/2015 | Nagase et al. |
| 2016/0068158 A1 | 3/2016 | Elwart et al. |
| 2016/0129907 A1 | 5/2016 | Kim et al. |
| 2016/0161270 A1 | 6/2016 | Okumura |
| 2016/0209842 A1 | 7/2016 | Thakur et al. |
| 2016/0209843 A1 | 7/2016 | Meuleau et al. |
| 2016/0209848 A1 | 7/2016 | Kojo et al. |
| 2016/0260328 A1 | 9/2016 | Mishra et al. |
| 2016/0318511 A1 | 11/2016 | Rangwala |
| 2016/0318515 A1 | 11/2016 | Laur et al. |
| 2016/0334230 A1 | 11/2016 | Ross et al. |
| 2016/0334797 A1 | 11/2016 | Ross et al. |
| 2016/0335892 A1 | 11/2016 | Okada et al. |
| 2016/0339919 A1 | 11/2016 | Habu et al. |
| 2016/0375766 A1 | 12/2016 | Konet et al. |
| 2016/0375768 A1 | 12/2016 | Konet et al. |
| 2017/0008168 A1 | 1/2017 | Weng et al. |
| 2017/0010108 A1 | 1/2017 | Shashua |
| 2017/0010617 A1 | 1/2017 | Shashua et al. |
| 2017/0031361 A1 | 2/2017 | Olson et al. |
| 2017/0032590 A1 | 2/2017 | Stefan et al. |
| 2017/0038777 A1 | 2/2017 | Harvey |
| 2017/0090478 A1 | 3/2017 | Blayvas et al. |
| 2017/0090480 A1 | 3/2017 | Ho et al. |
| 2017/0102700 A1 | 4/2017 | Kozak |
| 2017/0124476 A1 | 5/2017 | Levinson et al. |
| 2017/0137025 A1 | 5/2017 | Muto et al. |
| 2017/0158193 A1 | 6/2017 | Lopez et al. |
| 2017/0215045 A1 | 7/2017 | Rasal et al. |
| 2017/0225760 A1 | 8/2017 | Sidki et al. |
| 2017/0236422 A1 | 8/2017 | Naka et al. |
| 2017/0261325 A1 | 9/2017 | Schroeder et al. |
| 2017/0262790 A1 | 9/2017 | Khasis |
| 2017/0276780 A1 | 9/2017 | Takehara et al. |
| 2017/0277193 A1 | 9/2017 | Frazzoli et al. |
| 2017/0297576 A1 | 10/2017 | Halder et al. |
| 2017/0329338 A1 | 11/2017 | Wei et al. |
| 2017/0334451 A1 | 11/2017 | Asakura et al. |
| 2017/0356746 A1 | 12/2017 | Iagnemma |
| 2017/0357263 A1 | 12/2017 | Glatfelter et al. |
| 2017/0364831 A1 | 12/2017 | Ghosh et al. |
| 2017/0369051 A1 | 12/2017 | Sakai et al. |
| 2017/0369062 A1 | 12/2017 | Saigusa et al. |
| 2017/0369067 A1 | 12/2017 | Saigusa et al. |
| 2017/0371338 A1 | 12/2017 | Kamata et al. |
| 2018/0004214 A1 | 1/2018 | Wisniowski et al. |
| 2018/0011494 A1 | 1/2018 | Zhu et al. |
| 2018/0029500 A1 | 2/2018 | Katanoda |
| 2018/0032079 A1 | 2/2018 | Nishi |
| 2018/0046191 A1 | 2/2018 | Keller et al. |
| 2018/0129206 A1 | 5/2018 | Harada et al. |
| 2018/0147988 A1 | 5/2018 | Lee et al. |
| 2018/0173230 A1 | 6/2018 | Goldman-Shenhar et al. |
| 2018/0232585 A1 | 8/2018 | Kim |
| 2018/0290657 A1 | 10/2018 | Ryne et al. |
| 2018/0341880 A1 | 11/2018 | Kislovskiy et al. |
| 2018/0342033 A1 | 11/2018 | Kislovskiy et al. |
| 2018/0348786 A1 | 12/2018 | Yasui et al. |
| 2018/0349785 A1 | 12/2018 | Zheng et al. |
| 2018/0373245 A1 | 12/2018 | Nishi |
| 2019/0047564 A1 | 2/2019 | Brady et al. |
| 2019/0047584 A1 | 2/2019 | Donnelly |
| 2019/0086549 A1 | 3/2019 | Ushani et al. |
| 2019/0087307 A1* | 3/2019 | Zhan .............. G06F 8/30 |
| 2019/0096244 A1 | 3/2019 | Guruva Reddiar et al. |
| 2019/0113918 A1* | 4/2019 | England .............. G05D 1/024 |
| 2019/0129436 A1 | 5/2019 | Sun et al. |
| 2019/0135281 A1 | 5/2019 | Miura et al. |
| 2019/0193722 A1 | 6/2019 | Yamamuro et al. |
| 2019/0196471 A1* | 6/2019 | Vaughn .............. G05D 1/0221 |
| 2019/0258268 A1 | 8/2019 | MacNeille et al. |
| 2019/0295179 A1* | 9/2019 | Shalev-Shwartz .............. G01C 21/3407 |
| 2019/0299991 A1 | 10/2019 | Horii et al. |
| 2019/0310632 A1 | 10/2019 | Nakhaei Sarvedani |
| 2019/0310654 A1 | 10/2019 | Halder |
| 2019/0317506 A1 | 10/2019 | Ishioka |
| 2019/0329771 A1 | 10/2019 | Wray et al. |
| 2019/0329782 A1 | 10/2019 | Shalev-Shwartz et al. |
| 2019/0339088 A1* | 11/2019 | Jeswani .............. G01C 21/3691 |
| 2019/0359209 A1 | 11/2019 | Mizutani et al. |
| 2020/0079377 A1 | 3/2020 | Yashiro et al. |
| 2020/0097008 A1 | 3/2020 | Sadat et al. |
| 2020/0180647 A1 | 6/2020 | Anthony |
| 2020/0269871 A1 | 8/2020 | Schmidt et al. |
| 2020/0269875 A1 | 8/2020 | Wray et al. |
| 2020/0279488 A1 | 9/2020 | Shibasaki |
| 2020/0363814 A1 | 11/2020 | He et al. |

(56) References Cited

U.S. PATENT DOCUMENTS

| | | | |
|---|---|---|---|
| 2020/0389469 A1 | 12/2020 | Litichever et al. | |
| 2020/0406906 A1 | 12/2020 | Omari et al. | |
| 2021/0024092 A1* | 1/2021 | Han | B60L 58/21 |
| 2021/0089048 A1 | 3/2021 | Tran | |
| 2021/0116915 A1* | 4/2021 | Jiang | G05D 1/0088 |
| 2021/0237759 A1 | 8/2021 | Wray et al. | |
| 2021/0240190 A1 | 8/2021 | Wray et al. | |
| 2021/0279331 A1 | 9/2021 | Gilad et al. | |
| 2021/0294323 A1 | 9/2021 | Bentahar et al. | |
| 2021/0374540 A1* | 12/2021 | Yuan | G06N 10/00 |

FOREIGN PATENT DOCUMENTS

| | | | | |
|---|---|---|---|---|
| CN | 105620470 A | 6/2016 | | |
| CN | 105635849 A | 6/2016 | | |
| CN | 106103232 A | 11/2016 | | |
| CN | 106184223 A | 12/2016 | | |
| CN | 106428000 A | 2/2017 | | |
| CN | 107577227 A | 1/2018 | | |
| DE | 10341753 A1 | 4/2005 | | |
| DE | 102012005245 A1 | 9/2012 | | |
| DE | 102012220134 A1 | 5/2014 | | |
| DE | 102013212255 A1 | 12/2014 | | |
| DE | 102015201272 A1 | 7/2016 | | |
| DE | 102016203086 A1 | 8/2017 | | |
| EP | 2084690 A2 | 8/2009 | | |
| EP | 2902864 A1 | 8/2015 | | |
| EP | 2958783 A1 | 12/2015 | | |
| EP | 3273423 A1 | 1/2018 | | |
| JP | H02-114304 A | 4/1990 | | |
| JP | 2007179388 A | 7/2007 | | |
| JP | 2012-221291 A | 11/2012 | | |
| JP | 2015-140181 A | 8/2015 | | |
| JP | 2015-199439 A | 11/2015 | | |
| JP | 2015191273 A | 11/2015 | | |
| JP | 2016017914 A | 2/2016 | | |
| JP | 2016139163 A | 8/2016 | | |
| JP | 201781426 A | 5/2017 | | |
| JP | 2018-49445 A | 3/2018 | | |
| RU | 2436167 C1 | 12/2011 | | |
| WO | 2008/053373 A2 | 5/2008 | | |
| WO | 2012-172632 A1 | 12/2012 | | |
| WO | 2014/024336 A1 | 2/2014 | | |
| WO | 2014/130178 A1 | 8/2014 | | |
| WO | 2015/052865 A1 | 4/2015 | | |
| WO | 2015112651 A1 | 7/2015 | | |
| WO | 2016121572 A1 | 8/2016 | | |
| WO | 2016124178 A1 | 8/2016 | | |
| WO | 2016129067 A1 | 8/2016 | | |
| WO | 2016130719 A2 | 8/2016 | | |
| WO | 2017/013746 A1 | 1/2017 | | |
| WO | 2017/013749 A1 | 1/2017 | | |
| WO | 2017/022448 A1 | 2/2017 | | |
| WO | 2017/120336 A2 | 7/2017 | | |
| WO | 2018147872 A1 | 8/2018 | | |
| WO | WO-2018147874 A1 * | 8/2018 | | B60K 31/00 |

OTHER PUBLICATIONS

Bai et al., Intention-Aware Online POMPD Planning for Autonomous Driving in a Crowd; 2015 IEEE International Conference on Robotics and Automation; Washington State Convention Center, Seattle, Washington; May 26-30, 2015; pp. 454-460.

Extended European Search Report of corresponding application EP 17895657.9; dated Feb. 25, 2020; 9 pages.

Chryssanthacopoulos et al., Decomposition Method for Optimized Collision Avoidance with Multiple Threats; DASC 2011, 30th IEEE/AIAA Digital Avionics Systems Conference, Oct. 16-20, 2011, 21 pages; https://ieeexplore.ieee.org/document/6095973.

Wray et al., Online Decision-Making for Scalable Autonomous Systems; Conference: Twenty-Sixth International Joint Conference on Artificial Intelligence; Conference Paper—Aug. 2017 ; 7 pages https://www.researchgate.net/publication/318830226_Online_Decision-Making_for_Scalable_Autonomous_Systems.

Wray et al., Online Decision-Making for Scalable Autonomous Systems; Power Point Presentation; Aug. 23, 2017.

Miller, Tim, Explanation in Artificial Intelligence: Insights from the Social Sciences; Aug. 15, 2018; 66 pages; arXiv:1706.07269v3 ; https://arxiv.org/abs/1706.07269.

Bouton et al., Scalable Decision Making with Sensor Occlusions for Autonomous Driving; 2018 IEEE International Conference on Robotics and Automation (ICRA), Brisbane, Australia, May 21-25, 2018; 6 pages.

Brechtel et al.; Probabilistic decision-making under uncertainty for autonomous driving using continuous POMDPs; In: 2014 IEEE 17th International Conference on Intelligent Transportation Systems (ITSC); Oct. 11, 2014.

Santana et al.; Robust Coordination of Autonomous Systems through Risk-sensitive, Model-based Programming and Execution; Massachusetts Inst of Tech Cambridge Computer Science and Artificial Intelligence Lab; Oct. 9, 2015.

Kala et al.; Motion Planning of Autonomous Vehicles on a Dual Carriageway without Speed Lanes; Electronics; Jan. 13, 2015.

Matthews et al.; Intent Communication between Autonomous Vehicles and Pedestrians; 2015.

Ragi et al.; UAV path planning in a dynamic environment via partially observable Markov decision process; IEEE Transactions on Aerospace and Electronic Systems; Oct. 8, 2013.

Aoki, S. et al., A Merging Protocol for Self-Driving Vehicles, ICCPS, Apr. 2017.

International Application No. PCT/US2017/017493, filed Feb. 10, 2017.

International Application No. PCT/US2017/017502, filed Feb. 10, 2017.

International Application No. PCT/US2017/017516, filed Feb. 10, 2017.

International Application No. PCT/US2017/017527, filed Feb. 10, 2017.

U.S. Appl. No. 15/621,862, filed Jun. 13, 2017.

Tang et al., Modeling Drivers' Dynamic Decision-Making Behavior During the Phase Transition Period:An Analytical Approach Based on Hidden Markov Model Theory, IEEE Transactions On Intelligent Transportation Systems, vol. 17, No. 1, Jan. 2016. (9 pages).

Dai, P., Mausam, & Weld, D. (2021). Focused Topological Value Iteration. Proceedings of the International Conference on Automated Planning and Scheduling, 19(1), 82-89. https://doi.org/10.1609/icaps.v19i1.18138.

* cited by examiner

RISK AWARE EXECUTOR WITH ACTION SET RECOMMENDATIONS

TECHNICAL FIELD

This disclosure relates to autonomous vehicle operational management and autonomous driving.

BACKGROUND

A vehicle, such as an autonomous vehicle, may traverse a portion of a vehicle transportation network. Traversing the portion of the vehicle transportation network may include generating or capturing, such as by a sensor of the vehicle, data, such as data representing an operational environment, or a portion thereof, of the vehicle. Accordingly, a system, method, and apparatus for autonomous vehicle operational management control may be advantageous.

SUMMARY

A first aspect is a method for use in traversing a vehicle transportation network by an autonomous vehicle (AV). The method includes traversing, by the AV, the vehicle transportation network. Traversing the vehicle transportation network includes identifying a distinct vehicle operational scenario; instantiating a first decision component instance; receiving a first set of candidate vehicle control actions from the first decision component instance; selecting an action; and controlling the AV to traverse a portion of the vehicle transportation network based on the action. The first decision component instance is an instance of a first decision component modeling the distinct vehicle operational scenario.

A second aspect is an autonomous vehicle that includes a processor that is configured to execute instructions stored on a non-transitory computer readable medium to receive respective sets of candidate actions from respective decision component instances; identify an intersecting set of actions as an intersection of the respective sets of candidate actions; select an action from the intersecting set of actions based on respective priorities of the respective decision components; and control the autonomous vehicle to traverse a portion of a vehicle transportation network based on the action. Each decision component instance is an instance of a decision component modeling a distinct vehicle operational scenario.

A third aspect is a method for use in traversing a vehicle transportation network by an autonomous vehicle. The method includes receiving a first set of candidate actions from a first decision component instance and a second set of candidate actions from a second decision component instance; identifying an intersecting set of actions as an intersection of the respective sets of candidate actions; using a model to select an action from the intersecting set of actions; and controlling the autonomous vehicle to traverse a portion of the vehicle transportation network based on the action. The first decision component instance is a first instance of a first decision component modeling a first distinct vehicle operational scenario, and the second decision component instance is a second instance of a second decision component modeling a second distinct vehicle operational scenario. Selecting the action is conditioned on a context of state vectors associated with the autonomous vehicle.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements.

DETAILED DESCRIPTION

Figure 1:
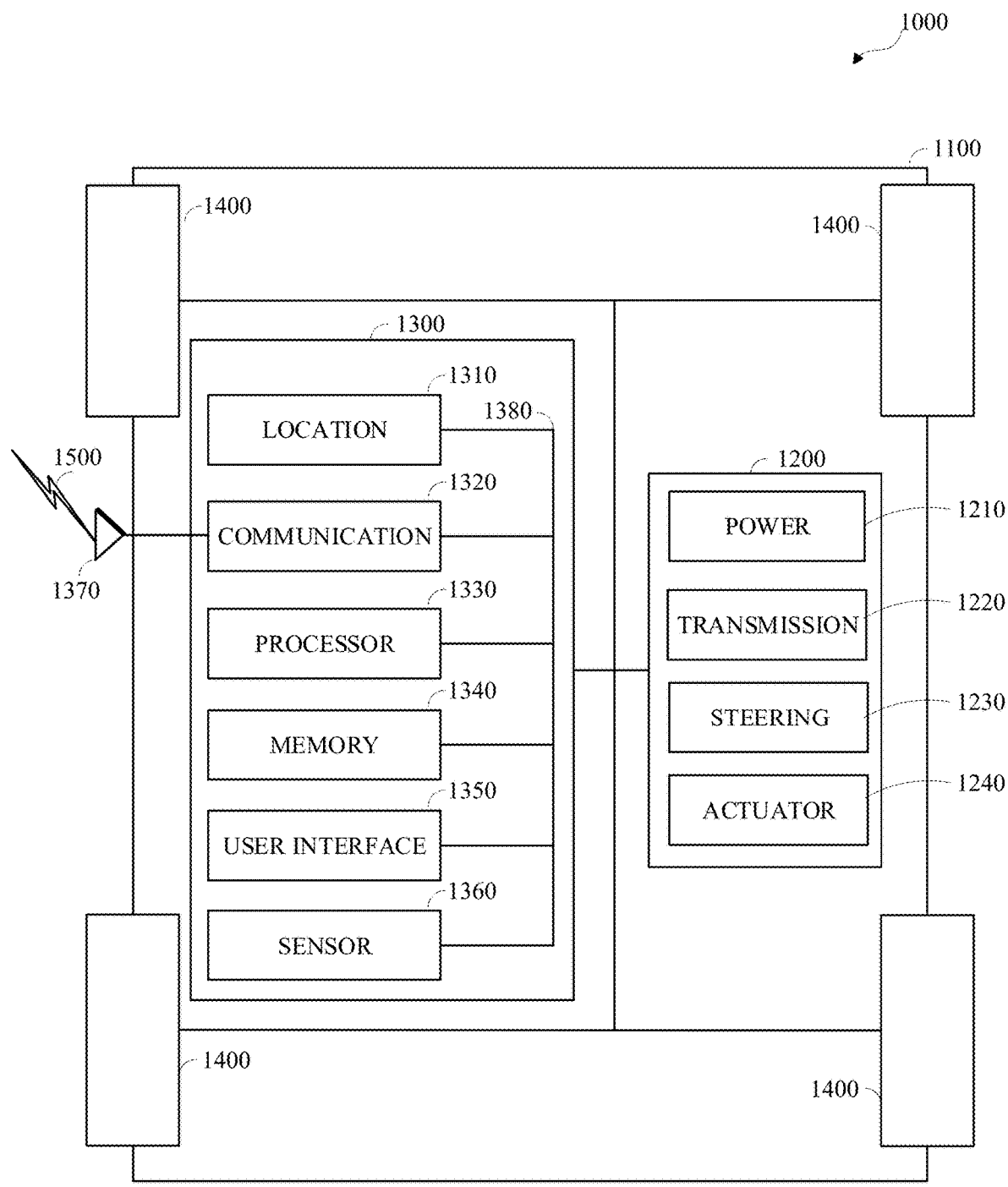
FIG. 1 is a diagram of an example of a vehicle in which the aspects, features, and elements disclosed herein may be implemented.

A vehicle, such as an autonomous vehicle, or a semi-autonomous vehicle, may traverse a portion of a vehicle transportation network. The vehicle may include one or more sensors and traversing the vehicle transportation network may include the sensors generating or capturing sensor data, such as sensor data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof.

The autonomous vehicle may include an autonomous vehicle operational management system, which may include one or more operational environment monitors that may process operational environment information, such as the sensor data, for the autonomous vehicle.

The autonomous vehicle operational management system may include an autonomous vehicle operational management controller (also referred to herein as an executor), which may detect one or more operational scenarios, such as pedestrian scenarios, intersection scenarios, lane change scenarios, or any other vehicle operational scenario or combination of vehicle operational scenarios, corresponding to the external objects. An operational scenario or a set related to operational scenarios may be referred herein as environment state.

The autonomous vehicle operational management system may include one or more scenario-specific operational control evaluation modules (SSOCEMs). Each scenario-specific operational control evaluation module may be a model, such as a Partially Observable Markov Decision Process (POMDP) model, of a respective operational scenario. That is, each model is configured to handle a specific scenario. The autonomous vehicle operational management controller (i.e., the executor) may instantiate respective instances of the scenario-specific operational control evaluation modules in response to detecting the corresponding operational scenarios.

The autonomous vehicle operational management controller (i.e., the executor) may receive candidate vehicle control actions from respective instantiated scenario-specific operational control evaluation module (SSOCEM) instances, may identify a vehicle control action from the candidate vehicle control actions, and may control the autonomous vehicle to traverse a portion of the vehicle transportation network according to the identified vehicle control action.

In some implementations, an SSOCEM may be configured to autonomously complete some tasks while requiring the intervention of a human to complete other tasks. That is, an SSOCEM can operate autonomously under certain conditions, but may require human intervention or aid in order to achieve its goal (e.g., crossing an intersection). As such, the SSOCEM can be in one of two binary autonomous states or levels.

For example, in response to detecting an obstacle on the road (i.e., on a portion of a vehicle transportation network), an SSOCEM may issue a request for assistance to a tele-operator. The tele-operator can be a human operator that is responsible for remotely monitoring and assisting one or more autonomous vehicles. The tele-operator can cause sensor data (e.g., camera images and/or video) to be streamed to the tele-operator so that the tele-operator can gain situational awareness and plot a navigation path for the AV around the obstacle and/or remotely control the actions of the AV.

In another example, a lane-traversal SSOCEM may use lane markers to maintain an AV within a lane. In some situations, the lane-traversal SSOCEM may no longer be able to demarcate the lane boundaries, such as in a case where the sensors may be dirty or have malfunctioned or the lane markers are covered with snow or mud. In such situations, the lane-traversal SSOCEM may request that a human (e.g., a driver occupant of the AV or a tele-operator) assume control of the AV.

Reliance on human assistance (i.e., intervention) can be indicative of the limited competence of the SSOCEM in its autonomy model. Human intervention can be costly. For example, it may take a relatively long period of time for a tele-operator to respond to a request for assistance from an AV. In the meanwhile, the AV may be obstructing traffic. For example, as the number of tele-operator requests for assistance from AV increases, the number of available tele-operators needs to necessarily increase.

In some implementations (which, for ease of reference, are referred to below as one-action-version) of this disclosure, each SSOCEM of a respective operational scenario selects one candidate action (i.e., a vehicle control action) that the SSOCEM identifies as the likely optimal action for the vehicle to perform for handling the respective particular scenario. The executor receives the candidate actions from all instantiated SSOCEMs and determines a vehicle control action based on the received candidate actions. In an example, the executor can choose the candidate action with the highest confidence score. In another example, the executor can choose the candidate action that is the safest (e.g., the candidate action that is the least likely to result in a collision) from among the candidate actions.

In such implementations, the executor has no knowledge of which SSOCEM recommended which candidate action. This can be detrimental to safe operations. For example, whereas one SSOCEM for an intersection scenario may recommend a "go" action and another SSOCEM for a lane-change scenario may recommend "stop" (as in "stop the lane change"), the executor may select the "stop" action, which causes to vehicle to stop in the middle of the intersection thereby causing, for example, a lateral, fast moving vehicle to broadside the AV.

As such, it can be advantageous for the executor to know (e.g., reason about, include processing logic related to, etc.) which SSOCEMs are recommending which candidate actions. That is, it may matter what was the type of problem (i.e., operational scenario) for which the action was recommended. That is, the semantics of the candidate action (e.g., "stop") can change depending on the SSOCEM that recommended the candidate action. For example, a "stop" candidate action from a lane-change operational scenario can mean "stop the lane change" or "do not change lanes;" however, a "stop" form an 4-way-stop operational scenario can mean "stop the velocity of the vehicle."

It can also be advantageous to assign different priorities to the different SSOCEMs. For example, the executor may assign a higher priority to a first candidate action of a first SSOCEM that is associated with a fast moving vehicle scenario than to a second candidate action of a second SSOCEM that is associated with an action that violated a rule (e.g., pass on the oncoming traffic lane).

Additionally, in such implementations, the executor selects one of the candidate actions without considering other meta (i.e., state) information regarding the operational scenario and/or the vehicle. For example, the candidate action provided by an SSOCEM may be a "turn left" action, which the executor selects. However, selecting such action can be detrimental to safe operations when, for example, the steering of the vehicle has malfunctioned and the vehicle can only turn right or go straight. As such, it can be advantageous for the executor to consider (e.g., reason about, etc.) such state information when determining which candidate action to select for controlling the vehicle.

Furthermore, in such implementations, having an SSOCEM provide one candidate action can lead to sub-optimal results. For example, assume that acceptable candidate actions for a first SSOCEM may be "turn left" and "stop," and acceptable candidate actions for a second SSOCEM may be "turn left" and "go." In implementations where each SSOCEM selects only one candidate action, the first SSOCEM may select "stop" (for example, because the "stop" action has a lower cost value than the "turn left" action) and the second SSOCEM may select "turn left." As such, the executor selects the "stop" action as "stop" is the safer action amongst "stop" and "turn left." However, under this scenario, "turn left" would have been a more preferred action for the executor to select.

To summarize, in the above-described implementations (i.e., the one-action-version), an executor does not know (i.e., receives no information regarding) which candidate action came from which SSOCEM. Thus, the executor selects a final action from an arbitrary list of candidate actions. Additionally, If a particular SSOCEM needs to communicate additional information to the executor, then the executor cannot give priority to the SSOCEM and/or the SSOCEM communication. As also mentioned above, the executor can only reason about one action recommendation from each SSOCEM. Thus, even if an SSOCEM can approve more than one candidate action, the SSOCEM transmits (e.g., sends, communicates, etc.) only one of those candidate actions to the executor as its recommendation. As also mentioned above, the executor cannot consider (e.g., use, reason about, etc.) any other factors in its decision (i.e., which candidate action to select). Such other factors include, by way of examples, a sensing issue (e.g., mud on camera, lower power LiDAR, etc.), an actuation issue (e.g., a flat tire, a steering lockup, etc.), a social factor, and/or a legal factor, or some other factors that SSOCEMs cannot and/or are not programmed (e.g., modeled, configured, etc.) to reason about.

Other implementations (referred to below as the action-set-version) according to this disclosure can improve the candidate action selection by an executor. In such implementations, an executor can reason about the type of each SSOCEM that the executor receives candidate actions from and/or the action(s) themselves, which are received from the SSOCEMs. For example, the executor can assign different priorities to different SSOCEMs depending on the associated operational scenarios that are solved by the SSOCEMs. Additionally, instead of receiving one candidate action from an SSOCEM, the SSOCEM can transmit (e.g., recommend, etc.) a set of candidate actions to the executor. Furthermore, the executor can be implemented as an MDP or a POMDP, as described with respect to SSOCEMs, so that the executor can reason sequentially about the overall context. Non-limiting examples of the context can include sensor or actuator information, knowledge about availability of human help (as further described below), etc. The context can be added as state factors that the executor (i.e., the (PO)MDP) can condition on in order choose a final action for controlling the vehicle.

Risk-aware executor with action set recommendations is described herein first with reference to a system and/or environment in which the teachings may be incorporated.

FIG. 1 is a diagram of an example of a vehicle in which the aspects, features, and elements disclosed herein may be implemented. In the embodiment shown, a vehicle 1000 includes various vehicle systems. The vehicle systems include a chassis 1100, a powertrain 1200, a controller 1300, and wheels 1400. Additional or different combinations of vehicle systems may be used. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 shown by example in FIG. 1 includes a power source 1210, a transmission 1220, a steering unit 1230, and an actuator 1240. Any other element or combination of elements of a powertrain, such as a suspension, a drive shaft, axles, or an exhaust system may also be included. Although shown separately, the wheels 1400 may be included in the powertrain 1200.

The power source 1210 includes an engine, a battery, or a combination thereof. The power source 1210 may be any device or combination of devices operative to provide energy, such as electrical energy, thermal energy, or kinetic energy. In an example, the power source 1210 includes an engine, such as an internal combustion engine, an electric motor, or a combination of an internal combustion engine and an electric motor, and is operative to provide kinetic energy as a motive force to one or more of the wheels 1400. Alternatively or additionally, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, transmits the energy to the wheels 1400 to provide a motive force. The transmission 1220 may be controlled by the controller 1300, the actuator 1240, or both. The steering unit 1230 may be controlled by the controller 1300, the actuator 1240, or both and control the wheels 1400 to steer the vehicle. The actuator 1240 may receive signals from the controller 1300 and actuate or control the power source 1210, the transmission 1220, the steering unit 1230, or any combination thereof to operate the vehicle 1000.

In the illustrated embodiment, the controller 1300 includes a location unit 1310, an electronic communication unit 1320, a processor 1330, a memory 1340, a user interface 1350, a sensor 1360, and an electronic communication interface 1370. Fewer of these elements may exist as part of the controller 1300. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips. The memory 1340 can be non-transitory computer readable medium.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 is operatively coupled with one or more of the location unit 1310, the memory 1340, the electronic communication interface 1370, the electronic communication unit 1320, the user interface 1350, the sensor 1360, and the powertrain 1200. For example, the processor may be operatively coupled with the memory 1340 via a communication bus 1380.

The memory 1340 includes any tangible non-transitory computer-usable or computer-readable medium, capable of, for example, containing, storing, communicating, or transporting machine readable instructions, or any information associated therewith, for use by or in connection with any processor, such as the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 is configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 includes a dedicated short range communications (DSRC) unit, an on-board unit (OBU), or a combination thereof.

The location unit 1310 may determine geolocation information, such as longitude, latitude, elevation, direction of travel, or speed, of the vehicle 1000. In an example, the location unit 1310 includes a GPS unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include both an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensors 1360 are operable to provide information that may be used to control the vehicle. The sensors 1360 may be an array of sensors. The sensors 1360 may provide information regarding current operating characteristics of the vehicle 1000, including vehicle operational information. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, which are operable to report information regarding some aspect of the current dynamic situation of the vehicle 1000.

The sensors 1360 include one or more sensors 1360 that are operable to obtain information regarding the physical environment surrounding the vehicle 1000, such as operational environment information. For example, one or more sensors may detect road geometry, such as lane lines, and obstacles, such as fixed obstacles, vehicles, and pedestrians. The sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 are combined.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel that is pivoted to a steering angle under control of the steering unit 1230, a propelled wheel that is torqued to propel the vehicle 1000 under control of the transmission 1220, or a steered and propelled wheel that may steer and propel the vehicle 1000.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 1300 may include the autonomous vehicle control unit.

When present, the autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network information representing the vehicle transportation network, or a combination thereof, and may control or operate the vehicle 1000 to traverse the vehicle transportation network in accordance with the route. For example, the autonomous vehicle control unit may output the route of travel to the trajectory controller to operate the vehicle 1000 to travel from the origin to the destination using the generated route.

Figure 2:
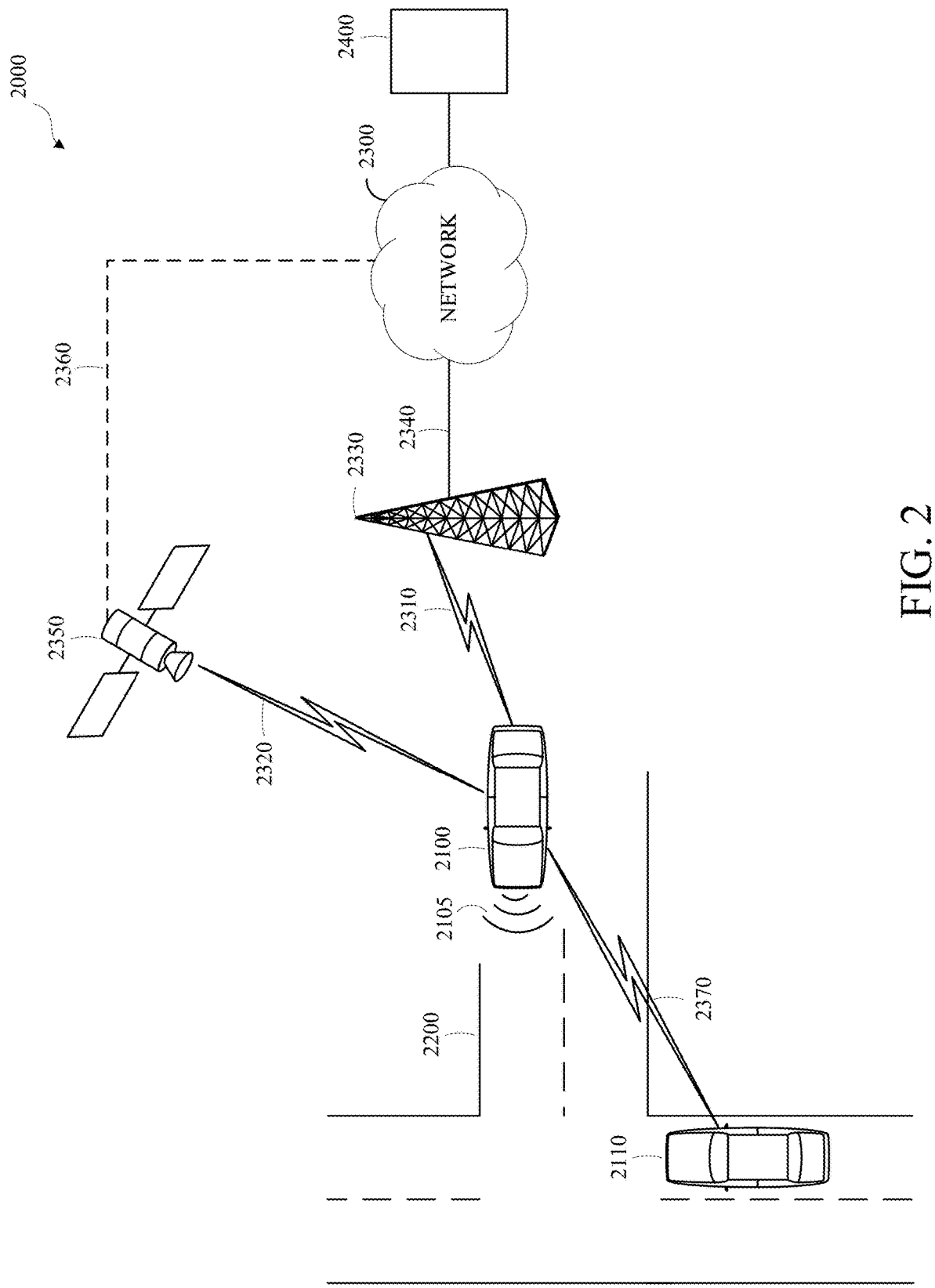
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which travels via one or more portions of the vehicle transportation network 2200, and communicates via one or more electronic communication networks 2300. Although not explicitly shown in FIG. 2, a vehicle may traverse an off-road area.

The electronic communication network 2300 may be, for example, a multiple access system that provides for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. As shown, a vehicle 2100/2110 communicates via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. The remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, is configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 2100 may communicate with the communications network 2300 via a satellite 2350, or other non-terrestrial communication device. The satellite 2350, which may include a computing device, is configured to communicate with a vehicle 2100, with a communication network 2300, with one or more communication devices 2400, or with a combination thereof via one or more communication links 2320/2360. Although shown as a single unit here, a satellite may include any number of interconnected elements.

An electronic communication network 2300 is any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 2100 may identify a portion or condition of the vehicle transportation network 2200. For example, the vehicle includes at least one on-vehicle sensor 2105, like the sensor 1360 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

The vehicle 2100 may traverse a portion or portions of the vehicle transportation network 2200 using information communicated via the network 2300, such as information representing the vehicle transportation network 2200, information identified by one or more on-vehicle sensors 2105, or a combination thereof.

Although FIG. 2 shows one vehicle transportation network 2200, one electronic communication network 2300, and one communication device 2400, for simplicity, any number of networks or communication devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

Figure 3:
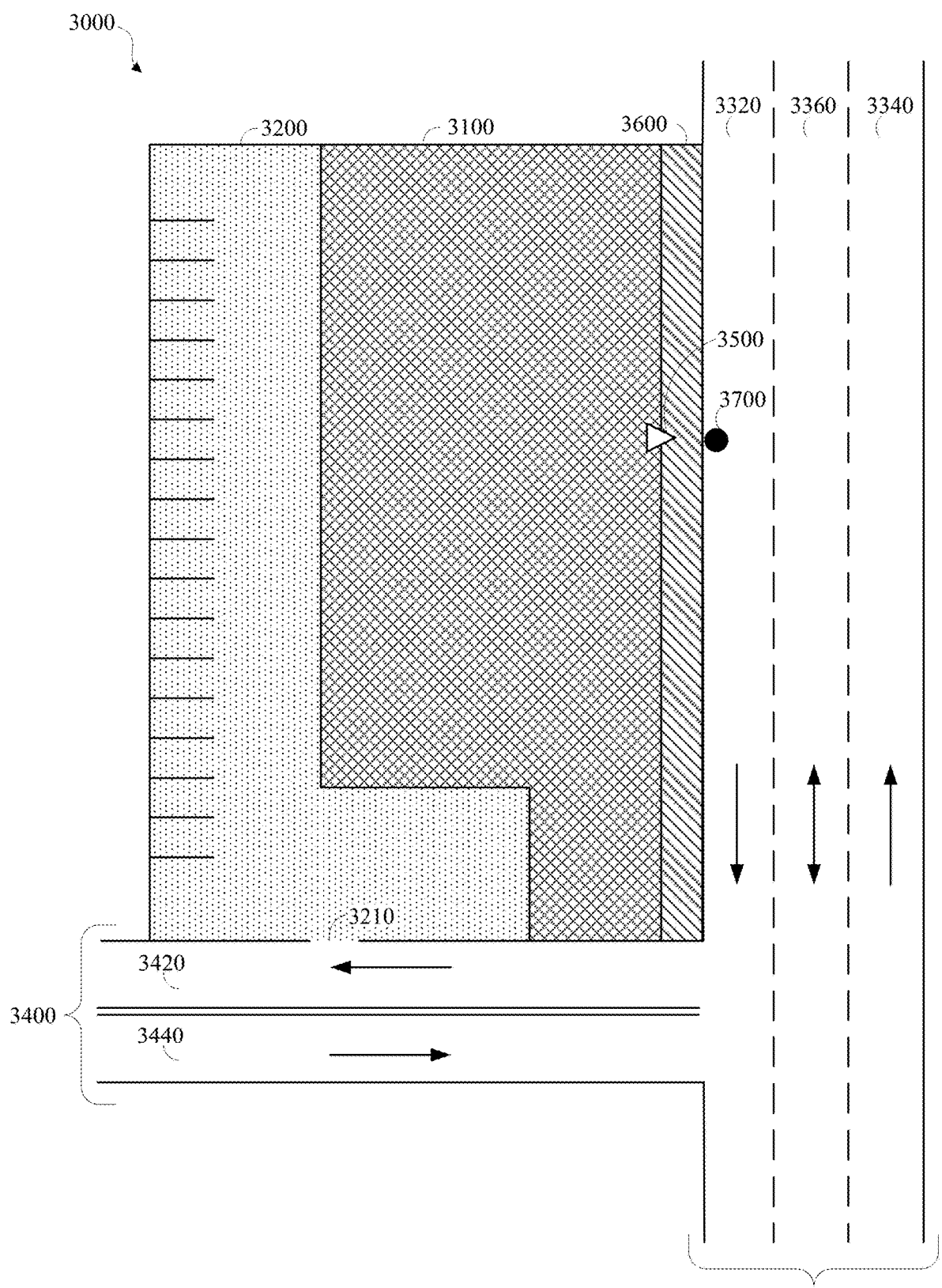
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network 3000 may include one or more interchanges 3210 between one or more navigable, or partially navigable, areas 3200/3300/3400. For example, the portion of the vehicle transportation network 3000 shown in FIG. 3 includes an interchange 3210 between the parking area 3200 and road 3400.

A portion of the vehicle transportation network 3000, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network 3000 shown in FIG. 3, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, a number of lanes, known hazards, or a combination thereof.

The vehicle transportation network may be associated with, or may include, a pedestrian transportation network. For example, FIG. 3 includes a portion 3600 of a pedestrian transportation network, which may be a pedestrian walkway. Although not shown separately in FIG. 3, a pedestrian navigable area, such as a pedestrian walkway or crosswalk, may correspond with a navigable area, or a partially navigable area, of a vehicle transportation network.

In some embodiments, a portion, or a combination of portions, of the vehicle transportation network may be identified as a point of interest or a destination. For example, the vehicle transportation network information may identify a building, such as the unnavigable area 3100, and the adjacent partially navigable parking area 3200 as a point of interest, a vehicle may identify the point of interest as a destination, and the vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Traversing a portion of the vehicle transportation network may proceed from a topological location estimate of the vehicle to a destination. The destination may be a discrete uniquely identifiable geolocation. For example, the vehicle transportation network may include a defined location, such as a street address, a postal address, a vehicle transportation network address, a GPS address, or a combination thereof for the destination. A destination may be associated with one or more entrances, such as the entrance 3500 shown in FIG. 3. A destination may be associated with one or more docking locations, such as the docking location 3700 shown in FIG. 3. A docking location 3700 may be a designated or undesignated location or area in proximity to a destination at which a vehicle may stop, stand, or park such that docking operations, such as passenger loading or unloading, may be performed.

Figure 4:
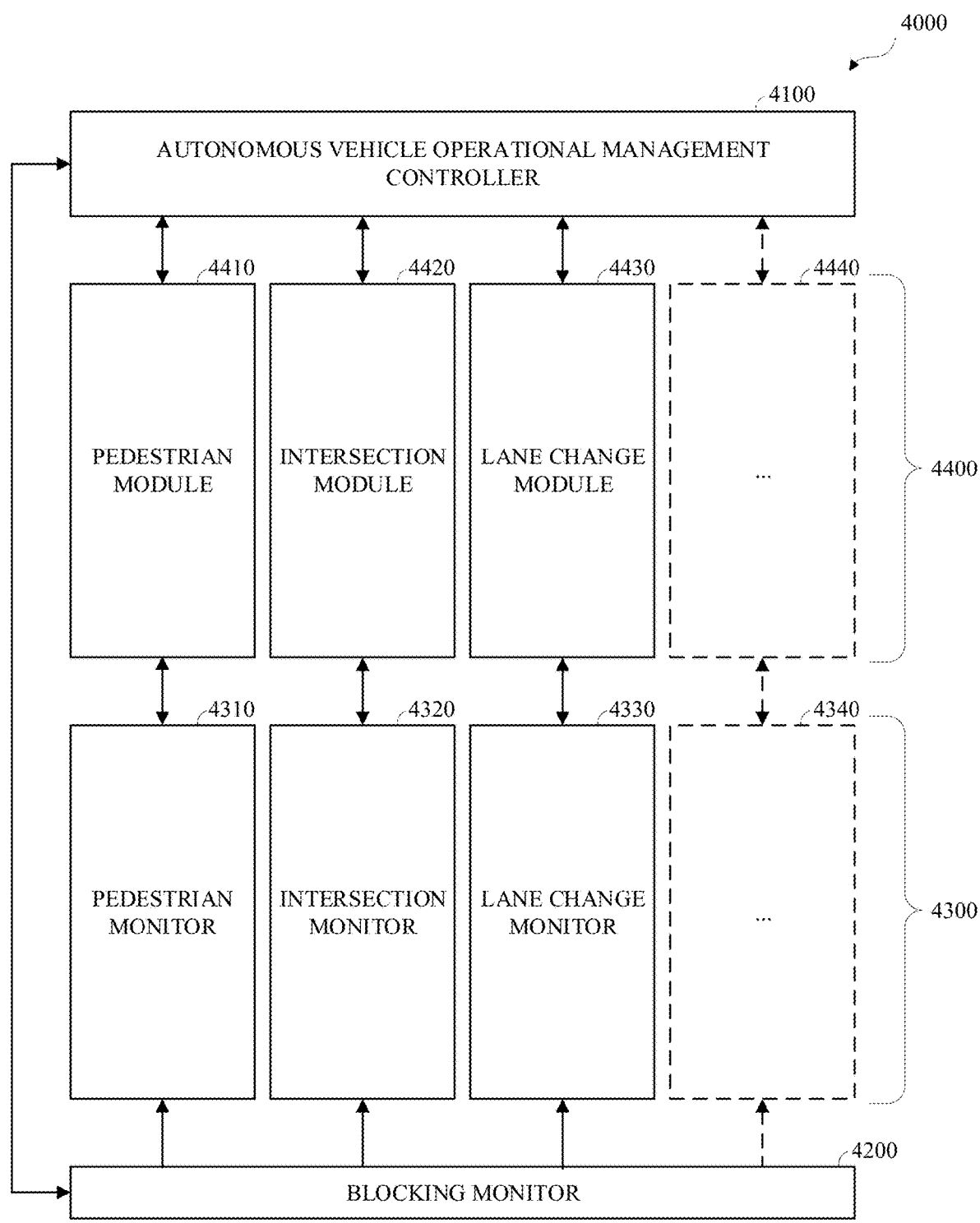
FIG. 4 is a diagram of an example of an autonomous vehicle operational management system in accordance with embodiments of this disclosure.

FIG. 4 is a diagram of an example of an autonomous vehicle operational management system 4000 in accordance with embodiments of this disclosure. The autonomous vehicle operational management system 4000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving.

An autonomous vehicle may traverse a vehicle transportation network, or a portion thereof, which may include traversing distinct vehicle operational scenarios. A distinct vehicle operational scenario (also called a scenario herein) may include any distinctly identifiable set of operative conditions that may affect the operation of the autonomous vehicle within a defined spatiotemporal area, or operational environment, of the autonomous vehicle. A distinct vehicle operational scenario may be based on a number or cardinality of roads, road segments, or lanes that the autonomous vehicle may traverse within a defined spatiotemporal distance. A distinct vehicle operational scenario may be based on one or more traffic control devices that may affect the operation of the autonomous vehicle within a defined spatiotemporal area, or operational environment, of the autonomous vehicle. A distinct vehicle operational scenario may be based on one or more identifiable rules, regulations, or laws that may affect the operation of the autonomous vehicle within a defined spatiotemporal area, or operational environment, of the autonomous vehicle. A distinct vehicle operational scenario may be based on one or more identifiable external objects that may affect the operation of the autonomous vehicle within a defined spatiotemporal area, or operational environment, of the autonomous vehicle.

Examples of distinct vehicle operational scenarios include a distinct vehicle operational scenario wherein the autonomous vehicle is traversing an intersection; a distinct vehicle operational scenario wherein a pedestrian is crossing, or approaching, the expected path of the autonomous vehicle; and a distinct vehicle operational scenario wherein the autonomous vehicle is changing lanes. A distinct vehicle operational scenario may separately include merging lanes, or the distinct vehicle operational scenario wherein the autonomous vehicle is changing lanes may also include merging lanes.

For simplicity and clarity, similar vehicle operational scenarios may be described herein with reference to vehicle operational scenario types or classes. A type or class of a vehicle operational scenario may refer to a particular pattern or set of patters on the scenario. For example, vehicle operational scenarios including pedestrians may be referred to herein as pedestrian scenarios referring to the types or classes of vehicle operational scenarios that include pedestrians. As an example, a first pedestrian vehicle operational scenario may include a pedestrian crossing a road at a crosswalk and as second pedestrian vehicle operational scenario may include a pedestrian crossing a road by jaywalking. Although pedestrian vehicle operational scenarios, intersection vehicle operational scenarios, and lane change vehicle operational scenarios are described herein, any other vehicle operational scenario or vehicle operational scenario type may be used.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right or crossing from right to left, may be represented within the second distinct vehicle operational scenario.

An autonomous vehicle may traverse multiple distinct vehicle operational scenarios within an operational environment, which may be aspects of a compound vehicle operational scenario. For example, a pedestrian may approach the expected path for the autonomous vehicle traversing an intersection.

The autonomous vehicle operational management system 4000 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

Controlling the autonomous vehicle to traverse the distinct vehicle operational scenarios may include identifying or detecting the distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

A vehicle control action may indicate a vehicle control operation or maneuver, such as accelerating, decelerating, turning, stopping, edging, or any other vehicle operation or combination of vehicle operations that may be performed by the autonomous vehicle in conjunction with traversing a portion of the vehicle transportation network.

The autonomous vehicle operational management controller 4100 (i.e., the executor), or another unit of the autonomous vehicle, may control the autonomous vehicle to traverse the vehicle transportation network, or a portion thereof, in accordance with a vehicle control action. Examples of vehicle control actions include a 'stop' vehicle control action that stops or otherwise controls the autonomous vehicle to become or remain stationary, an 'advance' vehicle control action that moves the autonomous vehicle forward slowly for a short distance, such as a few inches or a foot, an 'accelerate' vehicle control action that accelerates the autonomous vehicle (e.g., at a defined acceleration rate or within a defined range), a 'decelerate' vehicle control action that decelerates the autonomous vehicle (e.g., at a defined deceleration rate or within a defined range), a 'maintain' vehicle control action that maintains the current operational parameters (e.g., a current velocity, a current path or route, a current lane orientation, etc.), a 'turn' vehicle control action (which may include an angle of a turn), a 'proceed' vehicle control action that begins or resumes a previously identified set of operational parameters, or any other standard vehicle operation.

A vehicle control action may be a compound vehicle control action, which may include a sequence, combination, or both of vehicle control actions. For example, an 'advance' or 'edge' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

The autonomous vehicle operational management system 4000 may include the autonomous vehicle operational management controller 4100, a blocking monitor 4200, operational environment monitors 4300, SSOCEMs 4400, or a combination thereof. Although described separately, the blocking monitor 4200 may be an instance, or instances, of an operational environment monitor 4300.

The autonomous vehicle operational management controller 4100 may receive, identify, or otherwise access, operational environment information representing an operational environment for the autonomous vehicle, such as a current operational environment or an expected operational environment, or one or more aspects thereof. The operational environment of the autonomous vehicle may include a distinctly identifiable set of operative conditions that may affect the operation of the vehicle within a defined spatiotemporal area of the vehicle.

The operational environment information may include vehicle information for the autonomous vehicle, such as information indicating a geospatial location of the vehicle, information correlating the geospatial location to information representing the vehicle transportation network, a route of the vehicle, a speed of the vehicle, an acceleration state of the vehicle, passenger information of the vehicle, or any other information about the vehicle or the operation of the vehicle.

The operational environment information may include information representing the vehicle transportation network proximate to the autonomous vehicle, such as within a defined spatial distance (e.g., 300 meters) of the vehicle, information indicating the geometry of one or more aspects of the vehicle transportation network, information indicating a condition, such as a surface condition, of the vehicle transportation network, or any combination thereof.

The operational environment information may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the vehicle.

The autonomous vehicle operational management controller 4100 may monitor the operational environment of the autonomous vehicle, or defined aspects thereof. Monitoring the operational environment may include identifying and tracking external objects, identifying distinct vehicle operational scenarios, or a combination thereof.

For example, the autonomous vehicle operational management controller 4100 may identify and track external objects with the operational environment of the autonomous vehicle. Identifying and tracking the external objects may include identifying spatiotemporal locations of respective external objects, which may be relative to the vehicle, identifying one or more expected paths for respective external objects, which may include identifying a speed, a trajectory, or both, for an external object. Descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both.

The operational environment monitors 4300 may include a pedestrian operational environment monitor 4310, an intersection operational environment monitor 4320, a lane change operational environment monitor 4330, or a combination thereof. An operational environment monitor 4340 is shown using broken lines to indicate that the autonomous vehicle operational management system 4000 may include any number of operational environment monitors 4300.

One or more distinct vehicle operational scenarios may be monitored by a respective operational environment monitor 4300. For example, the pedestrian operational environment monitor 4310 may monitor operational environment information corresponding to multiple pedestrian vehicle operational scenarios, the intersection operational environment monitor 4320 may monitor operational environment information corresponding to multiple intersection vehicle operational scenarios, and the lane change operational environment monitor 4330 may monitor operational environment information corresponding to multiple lane change vehicle operational scenarios.

An operational environment monitor 4300 may receive, or otherwise access, operational environment information, such as operational environment information generated or captured by one or more sensors of the autonomous vehicle, vehicle transportation network information, vehicle transportation network geometry information, or a combination thereof. For example, the pedestrian operational environment monitor 4310 may receive, or otherwise access, information, such as sensor data, which may indicate, correspond to, or may otherwise be associated with, one or more pedestrians in the operational environment of the autonomous vehicle.

An operational environment monitor 4300 may associate the operational environment information, or a portion thereof, with the operational environment, or an aspect thereof, such as with an external object, such as a pedestrian, a remote vehicle, an aspect of the vehicle transportation network geometry, or the like.

An operational environment monitor 4300 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment information.

An operational environment monitor 4300 may output the information representing the one or more aspects of the operational environment to, or for access by, the autonomous vehicle operational management controller 4100, such as by storing the information representing the one or more aspects of the operational environment in a memory, such as the memory 1340 shown in FIG. 1, of the autonomous vehicle accessible by the autonomous vehicle operational management controller 4100, sending the information representing the one or more aspects of the operational environment to the autonomous vehicle operational management controller 4100, or a combination thereof. An operational environment monitor 4300 may output the information representing the one or more aspects of the operational environment to one or more elements of the autonomous vehicle operational management system 4000, such as the blocking monitor 4200

The pedestrian operational environment monitor 4310 may correlate, associate, or otherwise process the operational environment information to identify, track, or predict actions of one or more pedestrians. For example, the pedestrian operational environment monitor 4310 may receive information, such as sensor data, from one or more sensors, which may correspond to one or more pedestrians. The pedestrian operational environment monitor 4310 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian operational environment monitor 4310 may output the identified, associated, or generated pedestrian information to, or for access by, the autonomous vehicle operational management controller 4100.

The intersection operational environment monitor 4320 may correlate, associate, or otherwise process the operational environment information to identify, track, or predict actions of one or more remote vehicles in the operational environment of the autonomous vehicle, to identify an intersection, or an aspect thereof, in the operational environment, to identify vehicle transportation network geometry, or a combination thereof. For example, the intersection operational environment monitor 4320 may receive information, such as sensor data, from one or more sensors, which may correspond to one or more remote vehicles in the operational environment, the intersection, or one or more aspects thereof, in the operational environment, the vehicle transportation network geometry, or a combination thereof. The intersection operational environment monitor 4320 may associate the sensor data with one or more identified remote vehicles in the operational environment, the intersection, or one or more aspects thereof, in the operational environment, the vehicle transportation network geometry, or a combination thereof, which may include identifying a current or expected direction of travel, a path, such as an expected path, a current or expected velocity, a current or expected acceleration rate, or a combination thereof for one or more of the respective identified remote vehicles, and the intersection operational environment monitor 4320 may output the identified, associated, or generated intersection information to, or for access by, the autonomous vehicle operational management controller 4100.

The lane change operational environment monitor 4330 may correlate, associate, or otherwise process the operational environment information to identify, track, or predict actions of one or more remote vehicles in the operational environment of the autonomous vehicle, such as information indicating a slow or stationary remote vehicle along the expected path of the vehicle, to identify one or more aspects of the operational environment, such as vehicle transportation network geometry in the operational environment, or a combination thereof geospatially corresponding to a current or expected lane change operation. For example, the lane change operational environment monitor 4330 may receive information, such as sensor data, from one or more sensors, which may correspond to one or more remote vehicles in the operational environment of the autonomous vehicle, one or more aspects of the operational environment, or a combination thereof geospatially corresponding to a current or expected lane change operation. The lane change operational environment monitor 4330 may associate the sensor data with one or more identified remote vehicles in the operational environment of the autonomous vehicle, one or more aspects of the operational environment, or a combination thereof geospatially corresponding to a current or expected lane change operation, which may include identifying a current or expected direction of travel, a path, such as an expected path, a current or expected velocity, a current or expected acceleration rate, or a combination thereof for one or more of the respective identified remote vehicles. The lane change operational environment monitor 4330 may output the identified, associated, or generated lane change information to, or for access by, the autonomous vehicle operational management controller 4100.

The autonomous vehicle operational management controller 4100 may identify one or multiple distinct vehicle operational scenarios based on one or more aspects of the operational environment represented by the operational environment information. The autonomous vehicle operational management controller 4100 may identify a distinct vehicle operational scenario in response to identifying, or based on, the operational environment information indicated by one or more of the operational environment monitors 4300. For example, the operational environment information may include information representing a pedestrian approaching an intersection along an expected path for the autonomous vehicle, and the autonomous vehicle operational management controller 4100 may identify a pedestrian vehicle operational scenario, an intersection vehicle operational scenario, or both.

The autonomous vehicle operational management controller 4100 may instantiate respective instances of one or more of the SSOCEMs 4400 based on one or more aspects of the operational environment represented by the operational environment information. For example, the autonomous vehicle operational management controller 4100 may instantiate a respective instance of a SSOCEM 4400 in response to identifying an upcoming scenario. An upcoming scenario may be a distinct vehicle operational scenario that the autonomous vehicle operational management controller 4100 determines that the autonomous vehicle is likely to encounter if it continues in its path. Upcoming scenarios may be expected (e.g., can be determined from the route of the autonomous vehicle) or unexpected. An unexpected upcoming scenario may be a scenario that can be detected by the sensors of the vehicle and cannot be determined without sensor data.

A SSOCEM 4400, once instantiated, can receive the operational environment information, including sensor data, to determine and output a candidate vehicle control action, also called a candidate action herein. A candidate action is a vehicle control action that is identified by the particular SSOCEM 4400 as the likely optimal action for the vehicle to perform that will handle a particular scenario. For instance, a SSOCEM 4400 configured to handle intersections (e.g., an intersection SSOCEM 4420) may output a "proceed", a candidate action that suggests proceeding through an intersection. At the same time, a SSOCEM 4400 for handling lane changes (e.g., the lane change SSOCEM 4430) may output a "turn left" candidate action indicating that the vehicle should merge left by two degrees. In some implementations, each SSOCEM 4400 outputs a confidence score indicating a degree of confidence in the candidate action determined by the SSOCEM 4400. For instance, a confidence score greater than 0.95 may indicate a very high confidence in the candidate action, while a confidence score less than 0.5 may indicate a relatively low degree of confidence in the candidate action. Further details of a SSOCEM 4400 are described below.

The autonomous vehicle operational management controller 4100 receives the candidate actions and determines a vehicle control action based on the received candidate actions. In some implementations, the autonomous vehicle operational management controller 4100 utilizes hardcoded logic to determine the vehicle control action. For example, the autonomous vehicle operational management controller 4100 may select the candidate action having the highest confidence score. In other implementations, the autonomous vehicle operational management controller 4100 may select the candidate action that is the least likely to result in a collision. In other implementations, the autonomous vehicle operational management controller 4100 may generate a compound action based on two or more non-conflicting candidate actions (e.g., compounding 'proceed' and 'turn left by two degrees' to result in a vehicle control action that causes the vehicle to veer left and proceed through an intersection). In some implementations, the autonomous vehicle operational management controller 4100 may utilize a machine learning algorithm to determine a vehicle control action based on two or more differing candidate actions.

For example, identifying the vehicle control action from the candidate actions may include implementing a machine learning component, such as supervised learning of a classification problem, and training the machine learning component using examples, such as 1000 examples, of the corresponding vehicle operational scenario. In another example, identifying the vehicle control action from the candidate actions may include implementing a Markov Decision Process (MDP), or a Partially Observable Markov Decision Processes (POMDP), which may describe how respective candidate actions affect subsequent candidate actions, and may include a reward function that outputs a positive or negative reward for respective vehicle control actions.

The autonomous vehicle operational management controller 4100 may uninstantiate an instance of a SSOCEM 4400. For example, the autonomous vehicle operational management controller 4100 may identify a distinct set of operative conditions as indicating a distinct vehicle operational scenario for the autonomous vehicle, instantiate an instance of a SSOCEM 4400 for the distinct vehicle operational scenario, monitor the operative conditions, subsequently determine that one or more of the operative conditions has expired, or has a probability of affecting the operation of the autonomous vehicle below a defined threshold, and the autonomous vehicle operational management controller 4100 may uninstantiate the instance of the SSOCEM 4400.

The blocking monitor 4200 may receive operational environment information representing an operational environment, or an aspect thereof, for the vehicle. For example, the blocking monitor 4200 may receive the operational environment information from the autonomous vehicle operational management controller 4100, from a sensor of the vehicle, from an external device, such as a remote vehicle or an infrastructure device, or a combination thereof. The blocking monitor 4200 may read the operational environment information, or a portion thereof, from a memory, such as a memory of the autonomous vehicle, such as the memory 1340 shown in FIG. 1.

The blocking monitor 4200 may determine a respective probability of availability, or corresponding blocking probability, for one or more portions of the vehicle transportation network. The portions may include those portions of the vehicle transportation network corresponding to an expected path of the autonomous vehicle.

A probability of availability, or corresponding blocking probability, may indicate a probability or likelihood that the autonomous vehicle will traverse a portion of, or spatial location within, the vehicle transportation network safely, such as unimpeded by an external object, such as a remote vehicle or a pedestrian. For example, a portion of the vehicle transportation network may include an obstruction, such as a stationary object, and a probability of availability for the portion of the vehicle transportation network may be low, such as 0%, which may be expressed as a high blocking probability, such as 100%, for the portion of the vehicle transportation network. The blocking monitor 4200 may identify a respective probability of availability for each of multiple portions of the vehicle transportation network within an operational environment, such as within 300 meters, of the autonomous vehicle.

A probability of availability may be indicated by the blocking monitor 4200 corresponding to each external object in the operational environment of the autonomous vehicle and a geospatial area may be associated with multiple probabilities of availability corresponding to multiple external objects. An aggregate probability of availability may be indicated by the blocking monitor 4200 corresponding to each type of external object in the operational environment of the autonomous vehicle, such as a probability of availability for pedestrians and a probability of availability for remote vehicles, and a geospatial area may be associated with multiple probabilities of availability corresponding to multiple external object types.

The blocking monitor 4200 may identify external objects, track external objects, project location information, path information, or both for external objects, or a combination thereof. For example, the blocking monitor 4200 may identify an external object and identify an expected path for the external object based on operational environment information (e.g., a current location of the external object), information indicating a current trajectory and/or speed for the external object, information indicating a type of classification of the external object (e.g., a pedestrian or a remote vehicle), vehicle transportation network information (e.g., a crosswalk proximate to the external object), previously identified or tracked information associated with the external object, or any combination thereof. The expected path may indicate a sequence of expected spatial locations, expected temporal locations, and corresponding probabilities.

The blocking monitor 4200 may communicate probabilities of availability, or corresponding blocking probabilities, to the autonomous vehicle operational management controller 4100. The autonomous vehicle operational management controller 4100 may communicate the probabilities of availability, or corresponding blocking probabilities, to respective instantiated instances of the scenario-specific operational control evaluation modules 4400.

Although not expressly shown in FIG. 4, the autonomous vehicle operational management system 4000 may include a predictor module that may generate and send prediction information to the blocking monitor 4200, and the blocking monitor 4200 may output probability of availability information to one or more of the operational environment monitors 4300.

Each SSOCEM 4400 may model a respective distinct vehicle operational scenario. The autonomous vehicle operational management system 4000 includes any number of SSOCEMs 4400, each modeling a respective distinct vehicle operational scenario. Modeling a distinct vehicle operational scenario may include generating and/or maintaining state information representing aspects of an operational environment of the vehicle corresponding to the distinct vehicle operational scenario, identifying potential interactions among the modeled aspects respective of the corresponding states, and determining a candidate action that solves the model. Stated more simply, a SSOCEM 4400 may include one or more models that are configured to determine one or more vehicle control actions for handling a scenario given a set of inputs. The models may include, but are not limited to, Partially Observable Markov Decision Process (POMDP) models, Markov Decision Process (MDP) models, Classical Planning (CP) models, Partially Observable Stochastic Game (POSG) models, Decentralized Partially Observable Markov Decision Process (Dec-POMDP) models, Reinforcement Learning (RL) models, artificial neural networks, hardcoded expert logic, or any other suitable types of models. Examples of different types of models are provided below. Each SSOCEM 4400 includes computer-executable instructions that define a manner by which the models operate and a manner by which the models are utilized.

A SSOCEM 4400 may implement a CP model, which may be a single-agent model that models a distinct vehicle operational scenario based on a defined input state. The defined input state may indicate respective non-probabilistic states of the elements of the operational environment of the autonomous vehicle for the distinct vehicle operational scenario. In a CP model, one or more aspects (e.g., geospatial location) of modeled elements (e.g., external objects) that are associated with a temporal location may differ from the corresponding aspects associated with another temporal location, such as an immediately subsequent temporal location, non-probabilistically, such as by a defined, or fixed, amount. For example, at a first temporal location, a remote vehicle may have a first geospatial location, and, at an immediately subsequent second temporal location the remote vehicle may have a second geospatial location that differs from the first geospatial location by a defined geospatial distances, such as a defined number of meters, along an expected path for the remote vehicle.

A SSOCEM 4400 may implement a discrete time stochastic control process, such as a MDP model, which may be a single-agent model that model a distinct vehicle operational scenario based on a defined input state. Changes to the operational environment of the autonomous vehicle, such as a change of location for an external object, may be modeled as probabilistic changes. A MDP model may utilize more processing resources and may more accurately model the distinct vehicle operational scenario than a CP model.

A MDP model may model a distinct vehicle operational scenario using a set of states, a set of actions, a set of state transition probabilities, a reward function, or a combination thereof. In some embodiments, modeling a distinct vehicle operational scenario may include using a discount factor, which may adjust, or discount, the output of the reward function applied to subsequent temporal periods.

The set of states may include a current state of the MDP model, one or more possible subsequent states of the MDP model, or a combination thereof. A state represent an identified condition, which may be an expected condition, of respective defined aspects, such as external objects and traffic control devices, of the operational environment of the vehicle that may probabilistically affect the operation of the vehicle at a discrete temporal location. For example, a remote vehicle operating in the proximity of the vehicle may affect the operation of the vehicle and may be represented in a MDP model. The MDP model may include representing the following identified or expected information for the remote vehicle: its geospatial location, its path, heading, or both, its velocity, its acceleration or deceleration rate, or a combination thereof corresponding to a respective temporal location. At instantiation, the current state of the MDP model may correspond to a contemporaneous state or condition of the operating environment.

Although any number or cardinality of states may be used, the number or cardinality of states included in a model may be limited to a defined maximum number of states. For example, a model may include the 300 most probable states for a corresponding scenario.

The set of actions may include vehicle control actions available to the MDP model at each state in the set of states. A respective set of actions may be defined for each distinct vehicle operational scenario.

The set of state transition probabilities may probabilistically represent potential or expected changes to the operational environment of the vehicle, as represented by the states, responsive to the actions. For example, a state transition probability may indicate a probability that the operational environment corresponds to a respective state at a respective temporal location immediately subsequent to a current temporal location corresponding to a current state in response to traversing the vehicle transportation network by the vehicle from the current state in accordance with a respective action.

The set of state transition probabilities may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the vehicle.

Examples of state transition probabilities associated with a pedestrian vehicle operational scenario may include a defined probability of a pedestrian jaywalking (e.g., based on a geospatial distance between the pedestrian and the respective road segment); a defined probability of a pedestrian stopping in an intersection; a defined probability of a pedestrian crossing at a crosswalk; a defined probability of a pedestrian yielding to the autonomous vehicle at a crosswalk; any other probability associated with a pedestrian vehicle operational scenario.

Examples of state transition probabilities associated with an intersection vehicle operational scenario may include a defined probability of a remote vehicle arriving at an intersection; a defined probability of a remote vehicle cutting-off the autonomous vehicle; a defined probability of a remote vehicle traversing an intersection immediately subsequent to, and in close proximity to, a second remote vehicle traversing the intersection, such as in the absence of a right-of-way (piggybacking); a defined probability of a remote vehicle stopping, adjacent to the intersection, in accordance with a traffic control device, regulation, or other indication of right-of-way, prior to traversing the intersection; a defined probability of a remote vehicle traversing the intersection; a defined probability of a remote vehicle diverging from an expected path proximal to the intersection; a defined probability of a remote vehicle diverging from an expected right-of-way priority; any other probability associated with an intersection vehicle operational scenario.

Examples of state transition probabilities associated with a lane change vehicle operational scenario may include a defined probability of a remote vehicle changing velocity, such as a defined probability of a remote vehicle behind the vehicle increasing velocity or a defined probability of a remote vehicle in front of the vehicle decreasing velocity; a defined probability of a remote vehicle in front of the vehicle changing lanes; a defined probability of a remote vehicle proximate to the vehicle changing speed to allow the vehicle to merge into a lane; or any other probabilities associated with a lane change vehicle operational scenario.

The reward function may determine a respective positive or negative (cost) value accrued for each combination of state and action. This accrual represents an expected value of the vehicle traversing the vehicle transportation network from the corresponding state in accordance with the corresponding vehicle control action to the subsequent state.

For example, a POMDP model may include an autonomous vehicle at a first geospatial location and a first temporal location corresponding to a first state. The model may indicate that the vehicle identify and perform, or attempt to perform, a vehicle control action to traverse the vehicle transportation network from the first geospatial location to a second geospatial location at a second temporal location immediately subsequent to the first temporal location. The set of observations corresponding to the second temporal location may include the operational environment information that is identified corresponding to the second temporal location, such as geospatial location information for the vehicle, geospatial location information for one or more external objects, probabilities of availability, expected path information, or the like.

The set of conditional observation probabilities may include probabilities of making respective observations based on the operational environment of the autonomous vehicle. For example, the autonomous vehicle may approach an intersection by traversing a first road, contemporaneously, a remote vehicle may approach the intersection by traversing a second road, the autonomous vehicle may identify and evaluate operational environment information, such as sensor data, corresponding to the intersection, which may include operational environment information corresponding to the remote vehicle. The operational environment information may be inaccurate, incomplete, or erroneous. In a MDP model, the autonomous vehicle may non-probabilistically identify the remote vehicle, which may include identifying its location, an expected path, or the like, and the identified information, such as the identified location, based on inaccurate operational environment information, may be inaccurate or erroneous. In a POMDP model, the autonomous vehicle may identify information probabilistically identifying the remote vehicle, such as probabilistically identifying location information for the remote vehicle. The conditional observation probability corresponding to observing, or probabilistically identifying, the location of the remote vehicle represents the probability that the identified operational environment information accurately represents the location of the remote vehicle.

The set of conditional observation probabilities may be identified based on the operational environment information, such as the operational environment information described with respect to the reward function.

A SSOCEM 4400 may implement a Dec-POMDP model, which may be a multi-agent model that models a distinct vehicle operational scenario. A Dec-POMDP model may be similar to a POMDP model except that a POMDP model models the vehicle and a proper subset, such as one, of external objects and a Dec-POMDP models the autonomous vehicle and the set of external objects.

A SSOCEM 4400 may implement a POSG model, which may be a multi-agent model that models a distinct vehicle operational scenario. A POSG model may be similar to a Dec-POMDP except that the Dec-POMDP model includes a reward function for the vehicle and the POSG model includes the reward function for the vehicle and a respective reward function for each external object.

A SSOCEM 4400 may implement a RL model, which may be a learning model that models a distinct vehicle operational scenario. A RL model may be similar to a MDP model or a POMDP model except that defined state transition probabilities, observation probabilities, a reward function, or any combination thereof, may be omitted from the model. Instead, for example, the RL model may be a model-based RL model that generates state transition probabilities, observation probabilities, a reward function, or any combination thereof based on one or more modeled or observed events.

In a RL model, the model may evaluate one or more events or interactions, which can include simulated events, and may generate, or modify, a corresponding model, or a solution thereof, in response to the respective event. Simulated events may include, for example, traversing an intersection, traversing a vehicle transportation network near a pedestrian, or changing lanes. An example of using a RL model to traverse an intersection includes the RL model indicating a candidate action for traversing the intersection. The autonomous vehicle then traverses the intersection using the candidate action as the vehicle control action for a temporal location. A result of traversing the intersection using the candidate action may be determined to update the RL model based on the result.

The autonomous vehicle operational management system 4000 may include any number or combination of types of models. For example, the pedestrian SSOCEM 4410, the intersection SSOCEM 4420, and the lane change SSOCEM 4430 may implement POMDP models. In another example, the pedestrian SSOCEM 4410 may implement a MDP model and the intersection SSOCEM 4420 and the lane change SSOCEM 4430 may implement POMDP models. Further, the autonomous vehicle operational management controller 4100 may instantiate any number of instances of the SSOCEMs 4400 based on the operational environment information. A module 4440 is shown using broken lines to indicate that the autonomous vehicle operational management system 4000 may include any number or additional types of SSOCEMs 4400.

One or more of the autonomous vehicle operational management controller 4100, the blocking monitor 4200, the operational environment monitors 4300, or the SSOCEMs 4400, may operate continuously or periodically, such as at a frequency of ten hertz (10 Hz). For example, the autonomous vehicle operational management controller 4100 may identify a vehicle control action many times, such as ten times, per second. The operational frequency of each component of the autonomous vehicle operational management system 4000 may be synchronized or unsynchronized, and the operational rate of one or more of the autonomous vehicle operational management controller 4100, the blocking monitor 4200, the operational environment monitors 4300, or the SSOCEMs 4400 may be independent of the operational rate of others.

To briefly summarize, each of the SSOCEMs 4400 is an offline solution for dealing with a specific operational scenario (e.g., a pedestrian scenario, an intersection scenario, a lane change scenario, an external vehicle on the left scenario, an oncoming external vehicle scenario, etc.). When one of the operational environment monitors 4300 detects the respective operational scenario, it instantiates a copy of the corresponding original decision problem (e.g., one of the SSOCEMs 4400). Each of the SSOCEMs 4400 can have an internal state of the problem that it solves. Given that state, the SSOCEM recommends an action, which is computed by the SSOCEM using an objective function. Examples of recommended actions are stop, proceed (i.e., go), or advance (i.e., edge). The autonomous vehicle operational management controller 4100 selects one of the recommended actions. After the vehicle is controlled according to selected action, the state of the external world is reevaluated and the process repeats.

Any instantiated SSOCEMs are decoupled. That is, the SSOCEMs are not aware of each other's spaces (e.g., states). For example, if a first SSOCEM is associated with a pedestrian and a second SSOCEM is associated with a red vehicle, the first SSOCEM and the second SSOCEM solve their respective problems without considering any possible interactions between the pedestrian and the red vehicle. That is not to say that, for example, the first SSOCEM, in solving the pedestrian scenario, may not, if appropriate, take into account the existence of other external objects, such as the red vehicle, and vice versa.

Figure 5A:
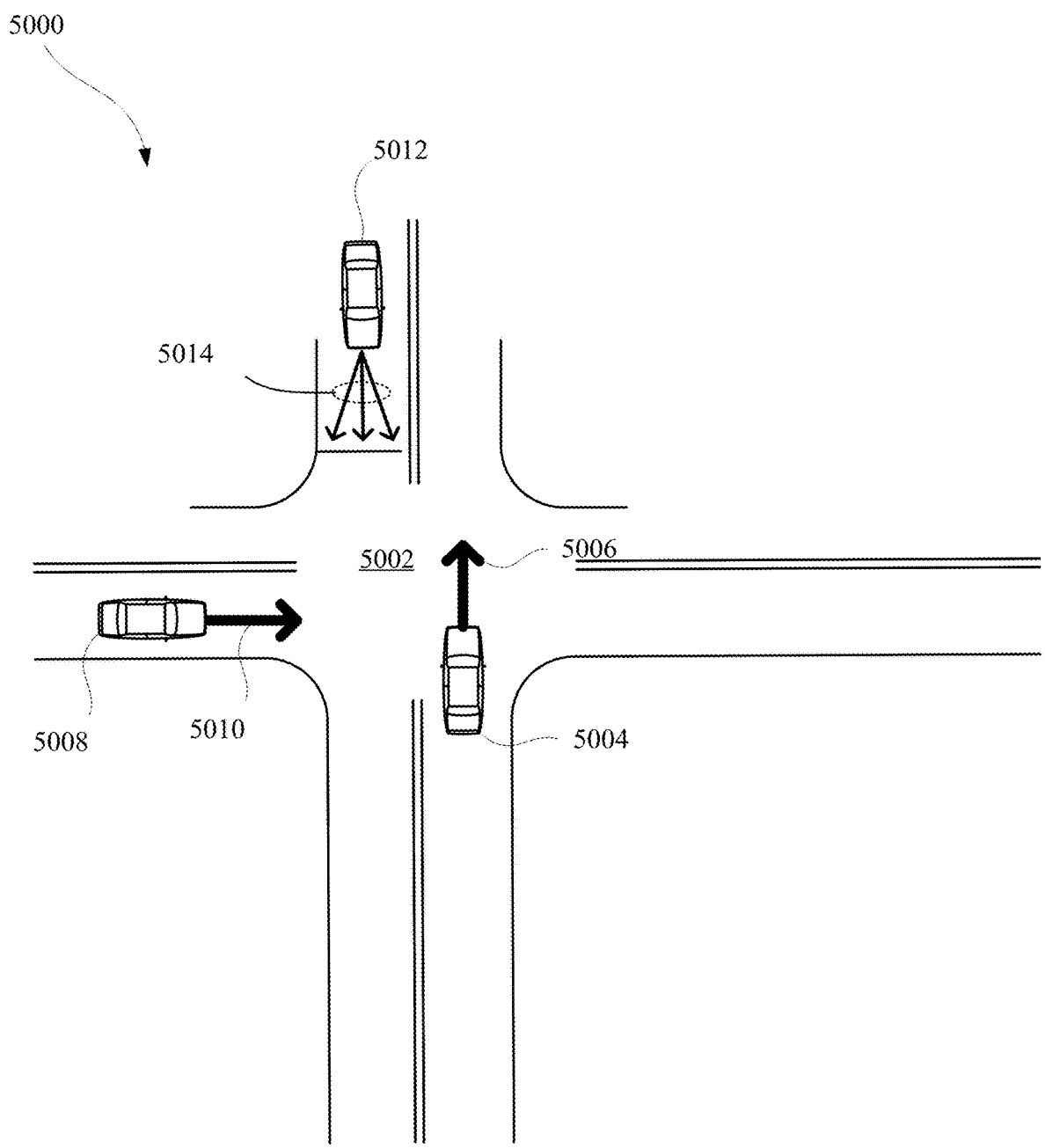
FIGS. 5A-5C are examples of scenarios used to describe the operations of autonomous vehicle operational management systems in accordance with embodiments of this disclosure.
Figure 5B:
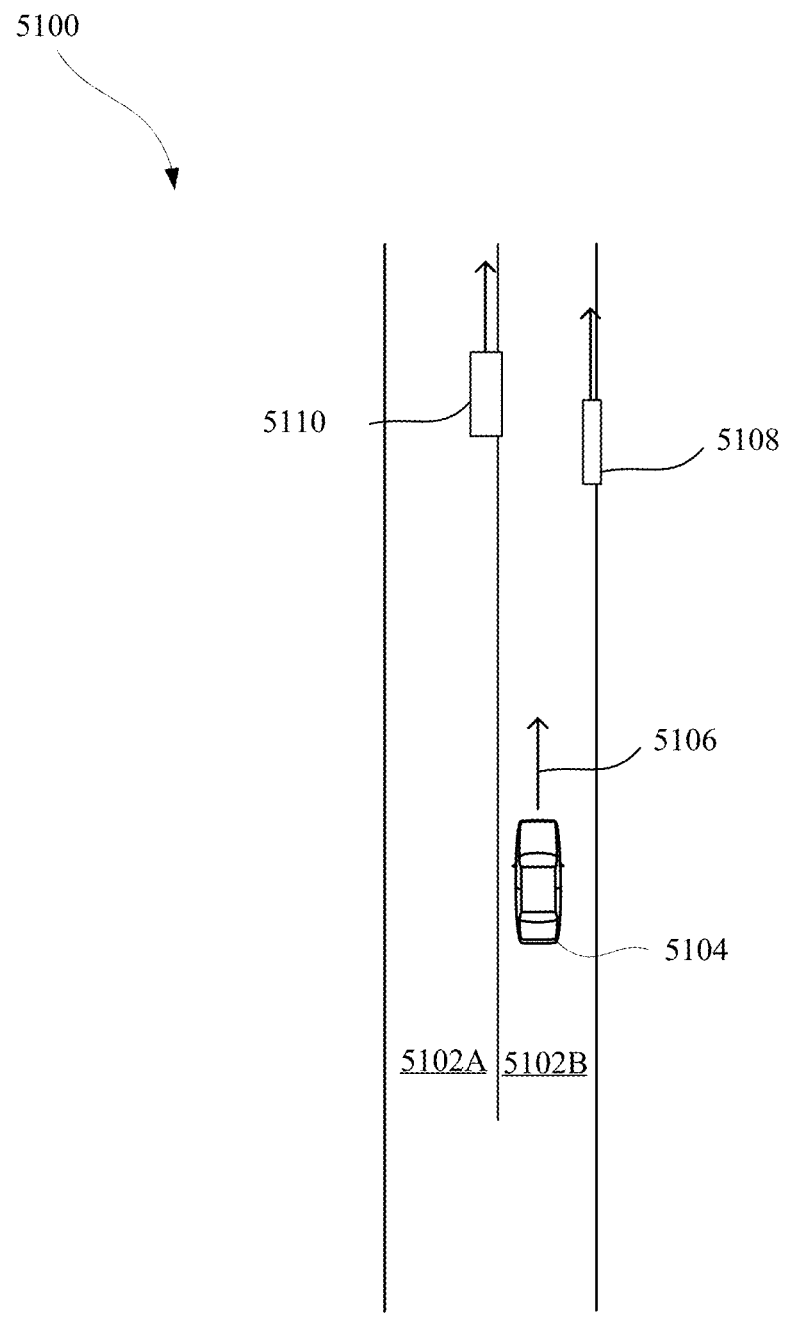
Figure 5C:
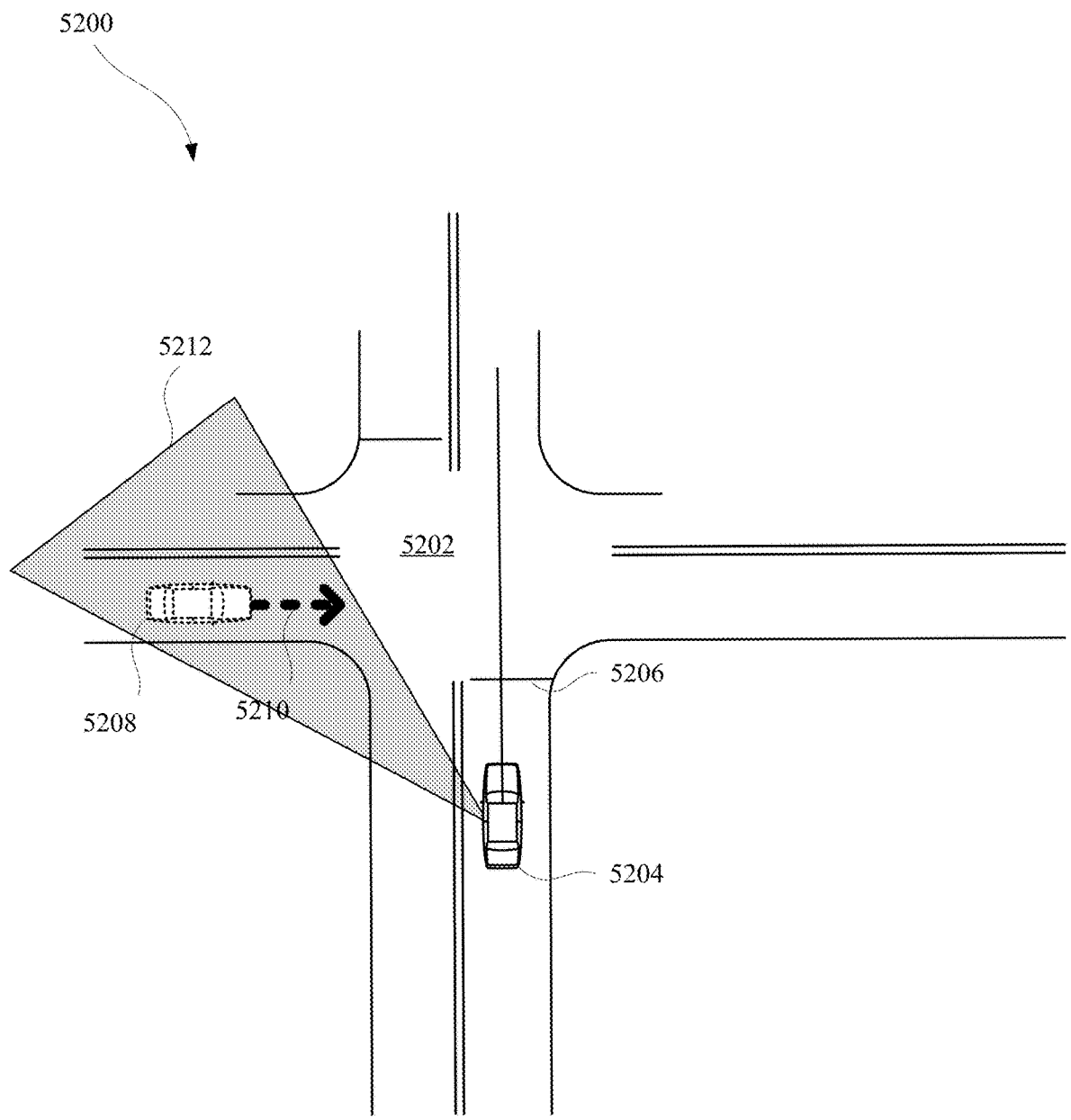

FIGS. 5A-5C are examples of scenarios 5000, 5100, 5200 used to describe the operations of autonomous vehicle operational management systems, such as the autonomous vehicle operational management system 4000 of FIG. 4, in accordance with embodiments of this disclosure. The autonomous vehicle operational management system can be incorporated in an autonomous vehicle (AV) and is used to control a the AV according to an action that the autonomous vehicle operational management system selects. The AV can be the vehicle 1000 shown in FIG. 1, one of the vehicles 2100/2110 shown in FIG. 2, a semi-autonomous vehicle, or any other vehicle implementing autonomous driving.

Each of the scenarios 5000, 5100, 5200 is used to describe the operations of a first version (referred to herein as the one-action-version) of an autonomous vehicle operational management system and a second version (referred to herein as the action-set-version) of an autonomous vehicle operational management system. The "one-action-version" and "action-set-version" monikers are merely short-hand labels that facilitate reference to an indicated version of the autonomous vehicle operational management system; otherwise, no specific meaning or limitation should be inferred from the words of the labels.

In the one-action-version, the autonomous vehicle operational management controller (i.e., the executor), such as the autonomous vehicle operational management controller 4100, receives only one candidate action from each SSOCEM, such as one or more of the SSOCEMs 4400. Additionally, the executor does not reason about any of the SSOCEMs that provided candidate actions, the candidate actions themselves, or any contextual information.

In the action-set-version, the executor can receive a set of candidate actions from each instantiated SSOCEM. An executor according to the action-set-version can reason about the received actions. The executor can reason about each SSOCEM. The executor can reason about contextual information, as described above. By "reason" is meant that the executor can use one or more of the candidate actions, the SSOCEMs, and/or the contextual (i.e., state) information in a model to select (based, for example, on a cost function) an action to control the AV. In the action-set-version, the executor can be a model, such as a POMDP model.

The scenario 5000 illustrates an intersection 5002 and an autonomous vehicle (AV) 5004. A current planned trajectory of the AV 5004 is indicated by an arrow 5006. The AV 5004 is at least partially inside the intersection 5002. A first vehicle 5008 and a second vehicle 5012 are detected by sensors of the AV 5004. As such a first SSOCEM can be instantiated and associated with the first vehicle 5008 and a second SSOCEM can be instantiated and associated with the second vehicle 5012.

In the one-action-version of the autonomous vehicle operational management system, the first SSOCEM recommends the action "go" (i.e., "proceed") because, if, otherwise, the recommended action is "stop," the AV 5004 will most likely be hit by the first vehicle 5008, which appears to be moving at a high velocity, as indicated by an arrow 5010.

The second SSOCEM recommends the action "stop" because the AV 5004 is unsure as to which path the second vehicle 5012 will take. As indicated by possible paths 5014, the AV 5004 may maintain probabilistic weights for each possible expected path of the second vehicle 5012. For example, the AV 5004 may have determined that the second vehicle 5012 may turn left, go straight, or turn right at the intersection 5002 with equal probabilities of 1/3. As such, in case the second vehicle 5012 turns left, the safest action for the AV 5004 is to stop. As such, the second SSOCEM recommends the candidate action "stop."

In the one-action-version, the executor can select the safest action from among the candidate actions received from instantiated SSOCEMs. As between "stop" and "go," the executor selects "stop." Selecting "stop," in the scenario 5000 is likely to lead to the AV 5004 being hit by the first vehicle 5008. This undesirable outcome is the result of the inability of the executor to reason about which SSOCEM recommended which action.

In the action-set-version, and assuming that the first SSOCEM recommends candidate action "go" to avoid being hit by the second vehicle 5012, and the second SSOCEM recommends "stop" because of the uncertainty associated with a predicted path of the second vehicle 5012, the executor selects the "go" action. In this version, the executor can reason about the type of SSOCEM that recommends which actions and can correctly prioritize their recommended actions (or recommended action sets).

In an example, the executor can reason that the SSOCEM corresponds to (or equivalently, that the "go" action is received from) an SSOCEM that is associated with an external object that is on the left side of the AV and is moving at a high speed as opposed to, for example, an oncoming external object that is ahead of the AV. In an example, the model of the executor can include reasoning related to where (i.e., which SSOCEM) an action came from. In an example, the final decision (i.e., the selected action) of the executor can be conditioned based on which SSOCEM the selected action came from.

In an example of the action-set-version, the executor can assign priorities to different SSOCEMs and/or to the actions (e.g., candidate action sets) recommended by the different SSOEMs. For example, the executor can assign a first priority to SSOCEMs associated with high-velocity objects (e.g., vehicles). The assigned priority can be related to the identified velocity of the object. The executor can assign a second priority to SSOCEMs that require violating a rule. The first priority can be higher than the second priority. All other SSOCEMs can be assigned a third priority that is smaller than the second priority. Other ways of assigning priorities are possible.

The scenario 5100 of FIG. 5B illustrates a two-lane road with a first lane 5102A and a second lane 5102B. An autonomous vehicle (AV) 5104 is in the second lane 5102B and is traveling in a direction 5106.

Described with respect to the scenario 5100 is action space (i.e., the list of all possible candidate actions) that includes the actions go (i.e., proceed), go-on-the-right, go-on-the-left, edge (i.e., advance), and stop. Such action space is not limited to the scenario 5100 and can be available with all scenarios. A go-on-the-right action can mean that the AV is to pass an object on the right side of the object while, for collision avoidance reasons, slightly shifting right from the object. A go-on-the-left action can mean that the AV is to pass an object on the left side of the object while, for collision avoidance reasons, slightly shifting left from the object. Action spaces according to implementations of this disclosure are not limited to any particular set of actions. The action space can include more actions, fewer actions, other actions, or a combination thereof than those listed above The scenario 5100 illustrates that sensors of the AV 5104 detected two objects. The scenario 5100 illustrates the bounding boxes of the two objects. A first object 5108, which may be traveling in the same direction as that of the AV 5104, is close to the right edge of the second lane 5102B. A second object 5110, which may also be traveling in the same direction as that of the AV 5104, is close to the right edge of the first lane 5102A. As such a first SSOCEM is instantiated and associated with the first object 5108 and a second SSOCEM is instantiated and associated with the second object 5110. The first object 5108 and the second object 5110 may be bicycles or motorcycles.

In the one-action-version of the autonomous vehicle operational management system, the first SSOCEM recommends the action "go-on-the-left" and the second SSOCEM recommends the action "go-on-the-right." The executor cannot choose either of the actions "go" or "edge." The executor cannot reason about why either of the "go" or "edge" actions is preferable because those action were not recommended to the executor. For example, the executor cannot simply select "go" if there is enough space between the objects 5108, 5110. For example, the executor cannot select the action "edge" to edge past the objects 5108, 5110. If the executor selects "go-on-the-left," the AV may collide with the second object 5110. Similarly, if the executor selects go-on-the-right, the AV may collide with the first object 5108.

In the action-set-version, the first SSOCEM can recommend the action set (e.g., a set of candidate vehicle control actions) that is the set of candidate actions {go, go-on-the-left, edge, stop}, and the second SSOCEM can recommend the action set {go, go-on-the-right, edge, stop}. As such, the executor can choose one of the actions "go" or "edge" because the actions "go" and "edge" are in the intersections of the two recommended sets of candidate actions. That is, in the action-set-version, the executor can take the intersection of the recommended action sets from all the instantiated SSOCEMs. In the case of the scenario 5100, the intersection is the set {go, edge, stop}. The intersection set constitutes the set of approved actions by the executor. In some situations, the intersection may be the empty set. In such situations, the executor can select a default action. In an example, the default action can be the "stop" action.

The only action that the first SSOCEM does not approve (e.g., recommend, include in the set of candidate actions, etc.) is the "go-on-the-right" action because selecting "go-on-the-right" may cause the AV to collide with the first object 5108. Similarly, the only action that the second SSOCEM does not approve is the "go-on-the-left" action because selecting "go-on-the-left" may cause the AV to collide with the object 5110.

As described above, the executor in the action-set version can be an POMDP. As such, the executor can reason about each of the approved action of the intersection set. For example, the executor may determine that there is enough space between the objects 5108 and 5110. As such, the executor can select the go action; otherwise, the executor can select the edge action. Either of the go or edge actions would be preferable to the stop action selected in the one-action-version as the AV can make forward progress in the action-set version of the autonomous vehicle operational management system.

The scenario 5100 illustrates, for example, that an executor of the action-set-version can resolve action conflicts because it receives recommendations as sets of actions. The executor can take the intersection of the sets of actions. The actions in the intersection are those actions that are approved by all instantiated SSOCEMs. However, in the one-action-version, the executor cannot resolve such action conflicts because the executor receives only a single candidate action from each SSOCEM.

The scenario 5200 of FIG. 5C illustrates that an AV 5204 is approaching an intersection 5202. The AV 5204 has not arrived at a stop line 5206 of the intersection 5202. As such, an intersection operational scenario SSOCEM is instantiated to select the next action for the AV 5204.

The scenario 5200 illustrates that a vehicle 5208 is in fact approaching the intersection 5202, as indicated by an arrow 5210. However, the left sensors of the AV 5204 do not sense the vehicle 5208. In an example, the vehicle 5208 may not be seen because the left sensor(s) of the AV 5204 may have malfunctioned. In an example, the vehicle 5208 may not be seen because the sensor(s) of the AV 5204 may be covered with mud. For example, the vehicle 5208 may not be seen because sensor information from the left sensor(s) of the AV 5204 may be deemed unreliable because, for example, the sensor(s) is low on power, is displaying a warning signal. There are a myriad of reasons why sensor(s) information may be deemed unavailable or unreliable. A cone of visibility 5212 indicates the area associated with an unreliable or unavailable sensor. Any objects within the cone of visibility 5212 cannot be seen. The dotted lines of the vehicle 5208 illustrate that the vehicle 5208 is not seen by the AV 5204 (i.e., by sensors of the AV 5204).

In the one-action-version, the SSOCEM recommends the action "go." This is so because the state from which the SSOCEM determines (e.g., selects) the action does not include the vehicle 5208. As mentioned above, SSOCEMs solve idealized (e.g., original) problems. It can become intractable and/or impractical to have SSOCEMs solve problems that include many contingencies (e.g., what if scenarios, variables, states, etc.). As such, it is not desirable to have the SSOCEMs include logic and/or states for factors such as malfunctioning sensors. The SSOCEMs solve problems in the idealized standard cases of driving. For example, an idealized standard problem of an intersection can be: there's a vehicle on the left and the intersection is a four-way stop. However, the operational scenario can be defined in some other way. The SSOCEM reasons (e.g., solves the POMDP problem) in the space that defines the problem to be solved. Additionally, the executor of the one-action-version merely selects an action.

In the action-set-version, the executor can reason about contextual factors, which can be related to the AV 5204 or other factors. For example, as the SSOCEM for the intersection 5202 observes that the intersection 5202 is empty, the SSOCEM recommends the action "go." The executor can factor into its reasoning (e.g., its model) that the left sensor (e.g., a camera, a LiDAR, etc.) is blocked (such as by mud) and that the SSOCEM relied in its decision on perfect left sensor sensing. As such, the executor can reason about the left blocked sensor.

As a POMDP, the executor can include state factors (i.e., state information) into its reasoning. Many state factors are possible. An example of a state factor can be a state associated with a sensor of the AV. For example, the state associated with a left sensor can be denoted S_left_sensor and can have the values {working, occluded}. An example of a state factor can be a state associated with an actuator of the AV. For example, the state associated with the steering of the AV can be denoted S_turnability and can have the values {working, only_turns_left, only_turns_right}. For example, the state associated with a tire of the AV can be denoted S_tire and can have the values {normal, low, blown_out}. Other state variables and values for those variables are possible. An example state factor can be a state associated with a tire of the AV.

Other examples of state factors can be legal, societal, or similar state factors. Such state factors can be such that it is desirable, necessary, or required to change the behavior of the AV. For example, a state factor can indicate that there is "a school on the left." For example, a state factor can indicate that there is "a driving school on the left." As such, any SSOCEM that relies on sensor information from the left side of the AV can be assigned a higher priority by the executor. That is the SSOCEM can be conditioned to have a higher priority. As such, regardless of what other SSO- CEMs recommend, if the SSOCEM recommends the action "stop," then the executor can select the "stop" action (because it may be the law to stop at schools).

Reasoning about such state factors can enable the executor to customize the action recommendations depending on the values of the state factors. To illustrate, if the AV cannot physically turn right and the path of the AV is such that the AV should turn right at the upcoming intersection, then the AV should not try to turn right at the intersection. Rather the AV should be stopped. Thus, the executor can convert an SSOCEM-recommended "turn right" action into a "stop" action since the turnability of the AV is such that the AV cannot physically turn to the right.

As mentioned above, in some situation an SSOCEM can request assistance from a tele-operator. As such, an action recommendation from the SSOCEM can be "request_assistance." However, in some situations, the tele-operator may not be available. For example, the AV may driving in a tunnel or some other area such that remote communications (e.g., internet connectivity) are not possible. As such, a state factor relating to the availability of a tele-operator can be denoted S_operator_available and can have the values {available, unavailable}.

By reasoning about the state factors, the executor of the action-set-version can override the "go" action of the SSOCEM and instead revert to safer action, such as "stop" or "edge."

To elaborate on the scenario 5200, it may be that the left sensor is returning a warning signal. Thus, the decision of the SSOCEM may not be trusted because it could very well be that the SSOCEM is not taking into consideration the vehicle 5208.

Two situations are possible. In a first case, the left sensor is working, the SSOCEM on the left recommends "go," and the executor selects the action "go." In a second case, the left sensor is returning a warning, the SSOCEM is recommending a "go" action, but the executor does not trust the action and converts the "go" to an "edge" action. Thus, the executor changes what that message (i.e., the action) from the SSOCEM means.

To reiterate, the problems of the instantiated SSOCEMs are solved offline in idealized situations, and the solutions of the SSOCEMs are of piecemeal stitched together online based on sensor information (i.e., based on the observed external objects relevant to each problem or SSOCEM). The executor can then perform vital reasoning based on state factors that are not available to the SSOCEMs.

To reiterate, in the action-set-version, the executor is modeled as a (PO)MDP and can reason in a state space. For at least some of the actions in the intersection set of recommended actions, the executor can choose an action and can reason about how its (i.e., the executor's) final decisions may affect the state of things (e.g., the world) over time, rather than at one time step.

In an example, at least one or more of the SSOCEMs 4400 can be capable of introspection. Introspection in this case refers to the capability of an SSOCEM to understand (e.g., reason about and evolve) the level of autonomy it can use to perform an action. As such, at least some of the actions of the action set recommended by an SSOCEM can have associated an autonomy level.

As mentioned above, an SSOCEM can issue a request for assistance to a tele-operator (i.e., a human). Reliance on human assistance (i.e., intervention) can be indicative of the limited competence of the SSOCEM in its autonomy model.

In an example, an SSOCEM can be, or can include, an autonomy cognizant agent (ACA) that selects an autonomy level for performing an action. The autonomy level can be selected based on an autonomy model that the ACA maintains and evolves. For example, initially, the autonomy model can indicate that the ACA is to seek human assistance (e.g., feedback) for an action given a detected environment state. As the ACA receives more and more feedback, such as from the human, the ACA can become less and less reliant on the human assistance because the ACA learns when it is appropriate to perform an action under lesser levels of assistance, which means higher of autonomy (i.e., competence). As such, the ACA can be said to be, or thought of as being, aware of its level of competence.

The ACA can consider all levels of autonomy available to it during plan generation (as opposed to, for example, adjusting the level of autonomy during plan execution). As such, the ACA can create plans that more effectively utilize the ACA's knowledge of its own levels of autonomy.

Additionally, the ACA can model multiple forms of human feedback, thereby enabling the ACA to proactively plan in a manner that also considers the likelihood of each form of human feedback. As such, the ACA can preemptively avoid situations where negative feedback is likely.

Furthermore, the ACA can maintain a predictive model of the human feedback and intervention through experience enabling the ACA to diminish the reliance of the ACA on humans over time by avoiding situations which are more likely to require human intervention as well as well as adjust the levels of autonomy of the ACA over time. As such, the ACA can perform at the least-cost level of autonomy for any situation (i.e., environment state) that the ACA encounters (i.e., detects based on sensor data).

In an example, the levels of autonomy can include four levels of autonomy; namely a "no-autonomy" level (i.e., a $l_0$ level), a "verified-autonomy" level (i.e., a $l_1$ level), a "supervised-autonomy" level (i.e., a $l_2$ level), and an "unsupervised-autonomy" level (i.e., a $l_4$ level). The disclosure herein is not limited to such autonomy levels. That is, other autonomy levels with different semantics are possible.

The "no-autonomy" level, $l_0$, can indicate that the ACA requires a human to perform the action instead of the ACA (i.e., the SSOCEM). The no-autonomy level can be summarized as the AV requesting that the human completely control the AV so that the human can get the AV out of a situation (e.g., an obstruction scenario).

The "verified-autonomy" level, $l_1$, can indicate that the ACA must query for, and receive, explicit approval from a human operator, before even attempting a selected (e.g., identified, determined, etc.) action. For example, in a sequence of actions (i.e., a plan) determined by the ACA of an SSOCEM, the ACA must ask for explicit approval for each action before the action is performed.

The "supervised-autonomy" level, $l_2$, can indicate that the ACA can perform the action autonomously as long as there is a human supervising (e.g., remotely, or otherwise, monitoring) the ACA. In the "supervised-autonomy" level, $l_2$, the human can intervene in the case that something goes wrong while the action is being autonomously performed. For example, a sequence of actions can be performed as long as a human is supervising the AV. If before or after performing an action of the sequence of actions, a failure is detected, then the ACA can request human (e.g., tele-operator) assistance.

To clarify the delineation between "verified-autonomy" level, $l_1$, and "supervised-autonomy" level, $l_2$, an example is now given. In "supervised-autonomy" level, $l_2$, the monitoring need not be remote. For example, an AV's testing procedure can be considered "supervised autonomy" as the AV can drive autonomously, but only with a supervising human in the AV who can be ready to override the AV and take control in dangerous situations. As a further delineation, "verified-autonomy" level, $l_1$, can require that the ACA receive explicit permission from a human (who may be either in the AV or remote), before executing the desired action. In particular, receiving explicit permission can mean that the ACA should stop until it receives the permission. On the other hand, in the "supervised-autonomy" level, $l_2$, there is no such requirement as long as there is a supervising human. That is, the ACA need not stop and can continuously perform its desired action, relying on the supervising human authority to override in the case of potential danger.

The "unsupervised-autonomy" level, $l_3$, can indicate that the ACA can be in full autonomous operation without requiring approval, supervision, or monitoring by a human.

As such, in an example, an SSOCEM (via its ACA) may determine that tele-operator help is required for an action that is recommended by the SSOCEM. In another example, each action recommended by an SSOCEM can be passed to an introspection SSOCEM that determines an autonomy level for performing the action.

The executor can prioritize such SSOCEMs (i.e., SSOCEMs for which human intervention is required) over other instantiated SSOCEMs. This is so because the idea is that the SSOCEM is reasoning about the capabilities of the AV to execute autonomously; and if the SSOCEM determines that tele-operator assistance is required, then the executor should override any other autonomous requests from other SSOCEMs. As such, it can be critical for the executor to reason about (e.g., know) the type of the original SSOCEM that recommended an action.

Figure 6:
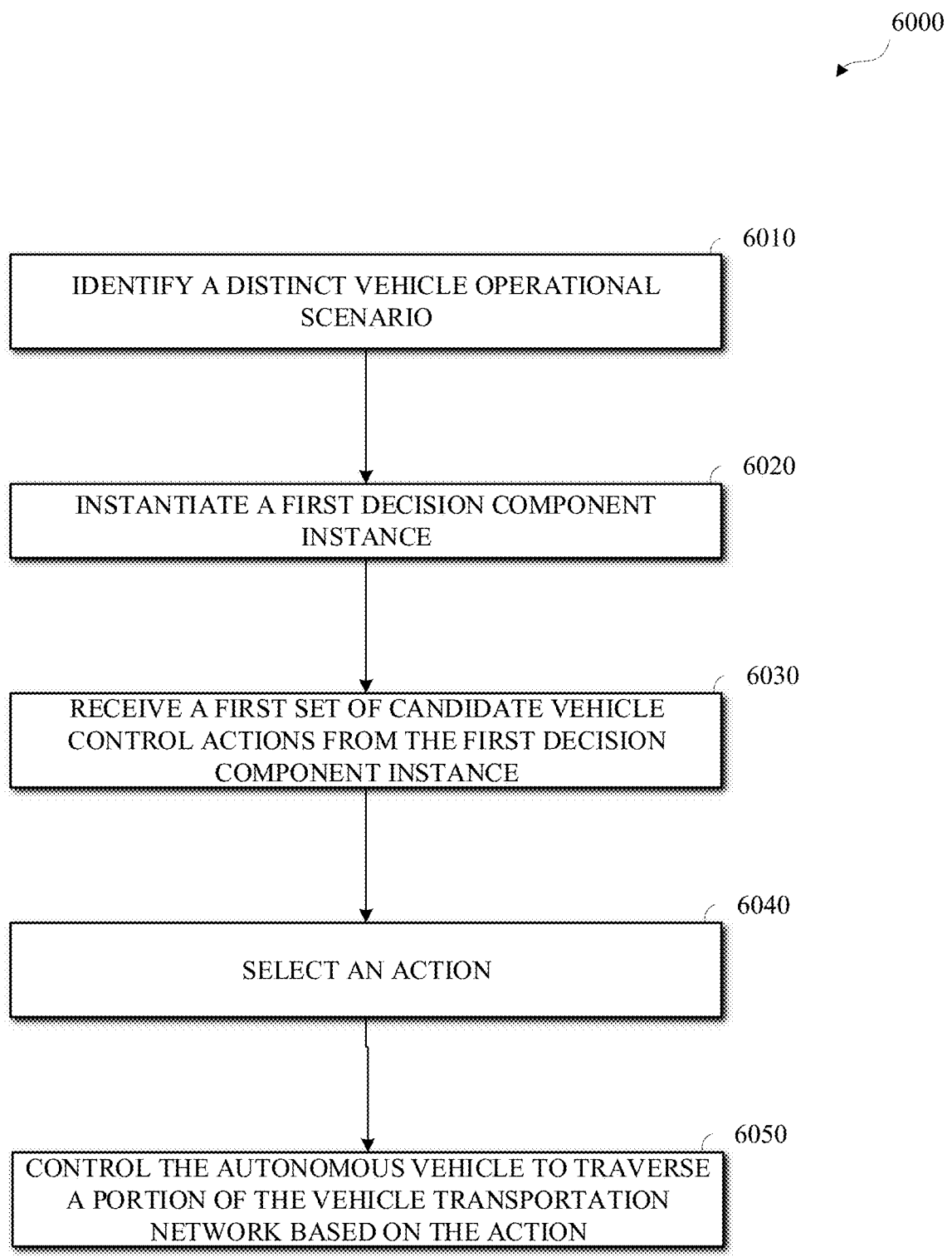
FIG. 6 is a flow chart diagram of an example of a technique for traversing a vehicle transportation network by an autonomous vehicle (AV) in accordance with embodiments of this disclosure.

FIG. 6 is a flow chart diagram of an example of a technique 6000 for traversing a vehicle transportation network by an autonomous vehicle (AV) in accordance with embodiments of this disclosure. The technique 6000 can be implemented by an autonomous vehicle operational management system, such as the autonomous vehicle operational management system 4000 of FIG. 4. At least some steps of the technique 6000 can be implemented by an executor, such as the autonomous vehicle operational management controller 4100 of FIG. 4. The technique 6000 can be implemented in or by an autonomous vehicle. The technique 6000 can be stored as executable instructions in a memory, such as the memory 1340 of FIG. 1. A processor, such as the processor 1330 of FIG. 1, can be configured to execute the instructions.

For at least some detected external objects and/or operational scenarios, a respective SSOCEM is instantiated, as described above. Each of the SSOCEMs can calculate (according to a model that the SSOCEM is designed to solve) a set of approved actions (i.e., a candidate vehicle control actions). The approved actions are provided to the executor. The executor selects one of the approved actions. The selected action can be used to control the AV to traverse a portion of the vehicle transportation network.

At 6010, the technique 6000 identifies a distinct vehicle operational scenario.

In an example, the distinct vehicle operational scenario can be identified in response to receiving sensor information. The sensor can be the sensor 1360 of FIG. 1. In an example, the sensor information can correspond to an external object (i.e., a first external object). In non-limiting illustrative examples, the external object can be the first vehicle 5008 of FIG. 5A, the second vehicle 5012 of FIG. 5A, the first object 5108 of FIG. 5B, or the second object 5110 of FIG. 5B. In another non-limiting example, with respect to FIG. 5B, the operational scenario can be identified as a blockage scenario or a following scenario.

In an example the distinct vehicle operational scenario can be identified based on map information, such as a High Definition (HD) map. The HD map can include information regarding road configurations, such as exits, number of lanes, intersections, traffic signals and signs, and the like. For example, with respect to FIG. 5C, map information can be used to detect an intersection operational scenario.

In an example, the distinct vehicle operational scenario can be identified based on a combination of map information and one or more external objects. For example, with respect to FIG. 5A, the operational scenario can be identified as an intersection scenario (e.g., the intersection 5002) wherein a first vehicle (e.g., the first vehicle 5008) exists at the left side of the AV and a second vehicle (e.g., the second vehicle 5012) is in the oncoming lane. Additional state information can be maintained for each of the constituents of the operational scenario.

In another example, and still referring to FIG. 5A, a first operational scenario can be identified as a vehicle (i.e., the first vehicle 5008) is approaching the AV from the side of the AV at an intersection; and a second operational scenario can be identified as a vehicle (i.e., the second vehicle 5012) being an oncoming vehicle at an intersection. With respect to FIG. 5C, the operational scenario can be an intersection scenario wherein no other external objects are observed.

At 6020, the technique 6000 instantiates a first decision component instance. The first decision component instance is an instance of a first decision component modeling the distinct vehicle operational scenario, as described above with respect to one or more of the SSOCEMs 4400. That is, the term "decision component instance" refers to an SSOCEM.

In an example, instantiating the first decision component instance can include, on a condition that identifying the distinct vehicle operational scenario includes identifying an intersection scenario, instantiating an intersection-decision component instance that is an instance of an intersection-decision component modeling the intersection scenario; on a condition that identifying the distinct vehicle operational scenario includes identifying a pedestrian scenario, instantiating a pedestrian-decision component instance that is an instance of a pedestrian-decision component modeling the pedestrian scenario; and, on a condition that identifying the distinct vehicle operational scenario includes identifying a lane-change scenario, instantiating a lane-change-decision component instance that is an instance of a lane-change-decision component modeling the lane-change scenario.

At 6030, the technique 6000 receives a first set of candidate vehicle control actions from the first decision component instance. For example, as described with respect to FIG. 5A, for the SSOCEM associated with the first vehicle 5008, the candidate vehicle control actions can be the set {go}. For example, as described with respect to FIG. 5A, for the SSOCEM associated with the second vehicle 5012, the candidate vehicle control actions can be the set {stop}. For example, as described with respect to FIG. 5B, for the SSOCEM associated with the first object 5108, the candidate vehicle control actions can be the set {go, go-on-the-left, edge, stop}. For example, as described with respect to FIG. 5B, for the SSOCEM associated with the second object 5110, the candidate vehicle control actions can be the set {go, go-on-the-right, edge, stop}. For example, as described with respect to FIG. 5C, for the SSOCEM associated with the intersection 5202, the candidate vehicle control actions can be the set {go, stop}.

At 6040, the technique 6000 selects an action for controlling the AV. In an example, the action can be one of stop, advance (i.e., edge), and proceed (i.e., go).

In an example, the technique 6000 selects one of the actions of the first set of candidate vehicle control actions. In an example, the technique 6000 selects the action based on a model that uses state information of the AV, wherein the state information is not known to the first decision component instance. That is, the first decision component instance does not select the first set of candidate vehicle control actions based on or using the state information. That is, the first decision component instance does not reason about (e.g., factor into its model) the state information. In an example, and as mentioned above, the model can be a Partially Observable Markov Decision Process (POMDP) model.

As mentioned above, the state information can include at least one of a first state of a sensor of the AV, a second state of an actuator of the AV, a third state of availability of a tele-operator, or a fourth state relating to an autonomy competence level of the AV. Other state information are possible. For example, state information related to legal rules, societal rules, or other vehicle-related state information are also possible.

At 6050, the technique 6000 controls the AV to traverse a portion of the vehicle transportation network based on the action.

In an example, the technique 6000 can also include instantiating a second decision component instance in response to receiving second sensor information corresponding to a second external object; receiving a second set of candidate vehicle control actions from the second decision component instance; and determining a third set of actions as an intersection between the first set of candidate vehicle control actions and the second set of candidate vehicle control actions. In an example, determining the third set of actions as the intersection between the first set of candidate vehicle control actions and the second set of candidate vehicle control actions can include, on a condition that the intersection is empty, adding a default action to the third set of actions. In an example, the default action is the stop action.

In an example, and as described above, selecting the action for controlling the AV can include determining a first priority associated with the first decision component instance and a second priority associated with the second decision component instance; and selecting the action from the first set of candidate vehicle control actions based on a determination that the first priority is higher than the second priority. Many different ways of associating (e.g., assigning, etc.) priorities to decision component instances can be possible. In an example, a highest priority can be associated with first decision components associated with higher velocity vehicles, an intermediate priority can be associated with second decision components that require a rule violation, and a lowest priority can be associated with other types of decision components. An example of a rule violation can be that the AV travels in the oncoming traffic lane to, for example, get around an obstruction, such as a stopped vehicle.

In an example, controlling the AV to traverse the portion of the vehicle transportation network based on the action can include determining whether to traverse the portion of the vehicle transportation network in accordance with the action. For example, and as mentioned above, the technique 6000 (e.g., the executor) can change the action based on the priority and/or type of the decision component instance that recommended the selected action.

In an example, controlling the AV to traverse the portion of the vehicle transportation network in accordance with the action can include, on a condition that the action is stop, controlling the AV to be stationary; on a condition that the action is advance, controlling the AV to traverse a defined cautionary distance in the vehicle transportation network at a defined cautionary rate; and, on a condition that the action is proceed, controlling the AV to traverse the vehicle transportation network in accordance with a previously identified vehicle control action.

Figure 7:
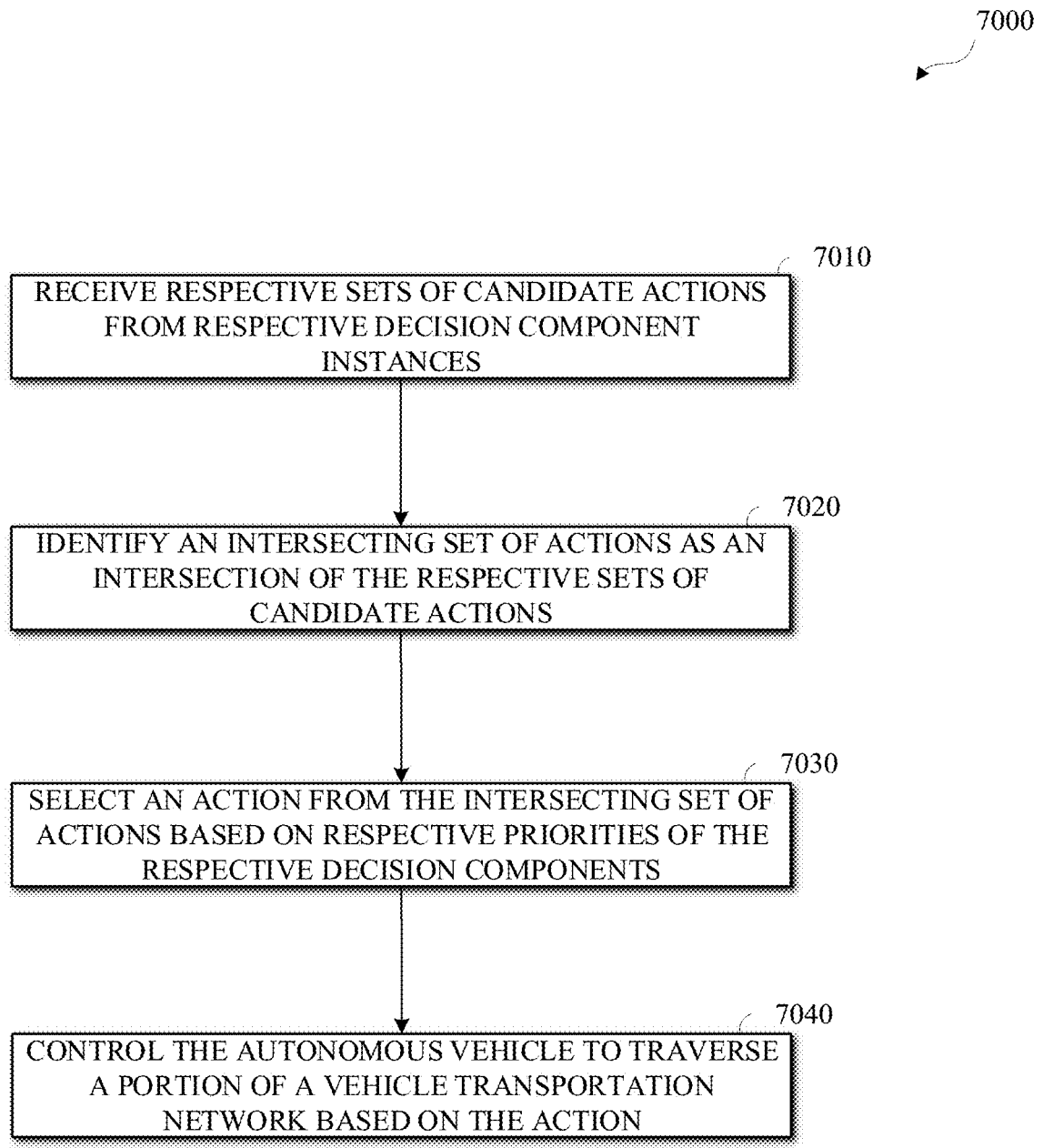
FIG. 7 is a flow chart diagram of an example of a technique for traversing a vehicle transportation network by an autonomous vehicle (AV) in accordance with embodiments of this disclosure.

FIG. 7 is a flow chart diagram of an example of a technique 7000 for traversing a vehicle transportation network by an autonomous vehicle (AV) in accordance with embodiments of this disclosure. The technique 7000 can be implemented by an autonomous vehicle operational management system, such as the autonomous vehicle operational management system 4000 of FIG. 4. At least some steps of the technique 7000 can be implemented by an executor, such as the autonomous vehicle operational management controller 4100 of FIG. 4. The technique 7000 can be implemented in or by an autonomous vehicle. The technique 7000 can be stored as executable instructions in a memory, such as the memory 1340 of FIG. 1. A processor, such as the processor 1330 of FIG. 1, can be configured to execute the instructions.

At 7010, and as described above, the technique 7000 receives respective sets of candidate actions from respective decision component instances, wherein each decision component instance is an instance of a decision component modeling a distinct vehicle operational scenario.

At 7020, and as described above, the technique 7000 identifies an intersecting set of actions as an intersection of the respective sets of candidate actions. At 7030, the technique 7000 selects an action from the intersecting set of actions based on respective priorities of the respective decision components. In an example, selecting the action can be based on state information of the autonomous vehicle. As described above, the state information of the autonomous vehicle is not used by at least some of the respective decision components. As also mentioned above, the action can be selected according to a Partially Observable Markov Decision Process model.

At 7040, the technique 7000 controls the autonomous vehicle to traverse a portion of a vehicle transportation network based on the action.

In an example, a highest priority can be associated with first decision components associated with higher velocity external objects, an intermediate priority can be associated with second decision components that require a rule violation, and a lowest priority can be associated with other types of decision components.

Another embodiment of the disclosed implementations is a technique for use in traversing a vehicle transportation network by an autonomous vehicle. The technique includes receiving a first set of candidate actions from a first decision component instance and a second set of candidate actions from a second decision component instance. As described above, the first decision component instance is a first instance of a first decision component modeling a first distinct vehicle operational scenario, and the second decision component instance is a second instance of a second decision component modeling a second distinct vehicle operational scenario. That is, the first decision component instance and the second decision component instance are SSOCEMs, as described above.

The technique also includes identifying an intersecting set of actions as an intersection of the respective sets of candidate actions; using a model to select an action from the intersecting set of actions, wherein selecting the action is conditioned on a context of state vectors associated with the autonomous vehicle; and controlling the autonomous vehicle to traverse a portion of the vehicle transportation network based on the action. In an example, selecting the action can further be conditioned on a first priority of the first decision component and a second priority of the second decision component. The action can be one of stop, advance, proceed, pass-on-left, or pass-on-right.

Described above are sets of actions. A set of actions can relate to the domain of the operational scenario solved by an SSOCEM. With respect to the domain of intersections, the actions can include the actions "go," "stop," and "edge." However, the set of actions can include more, fewer, other actions, or a combination thereof. In another scenario, the set of actions can be a different set of actions. For example, with respect to a passing scenario, the actions can include the actions "follow," "stop," "go-on-the-left" (i.e., "pass left,") and "go-on-the-right" (i.e., "pass right").

The action "go" can mean proceed along a trajectory. The action "stop" means that the vehicle should, in the next step/action step, remain stationary, or to stop if it were moving. The action "edge" can mean that the vehicle should edge slightly forward from a stop location. An "edge" action can be useful when, for example, in a current location of the vehicle the sensors of the vehicle are obstructed.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use in traversing a vehicle transportation network by an autonomous vehicle (AV), the method comprising:
    traversing, by the AV, the vehicle transportation network, wherein traversing the vehicle transportation network comprises:
        identifying a distinct vehicle operational scenario;
        instantiating a first decision component instance,
            wherein the first decision component instance is an instance of a first decision component that models the distinct vehicle operational scenario,
            wherein the first decision component instance provides a first solution to the distinct vehicle operational scenario, and
            wherein the first solution is obtained offline in a first idealized situation that is decoupled from a current context of the AV;
        instantiating a second decision component instance in response to receiving second sensor information corresponding to an external object
            wherein the second decision component instance provides a second solution for dealing with the external object, and
            wherein the second solution is obtained offline in a second idealized situation that is decoupled from the current context of the AV;
        receiving a first set of candidate vehicle control actions from the first decision component instance;
        receiving a second set of candidate vehicle control actions from the second decision component instance;
        determining a third set of actions as an intersection between the first set of candidate vehicle control actions and the second set of candidate vehicle control actions;
        selecting an action from the third set of actions;
        determining whether a current value of a state factor of the current context of the AV conflicts with a value of the state factor required for the action;
        response to determining that the current value of the state factor conflicts with the value required for the action, converting the action to another action; and controlling the AV to traverse a portion of the vehicle transportation network based on the action.

2. The method of claim 1, wherein selecting the action comprises:
   determining a first priority associated with the first decision component instance and a second priority associated with the second decision component instance; and
   selecting the action from the first set of candidate vehicle control actions based on a determination that the first priority is higher than the second priority.

3. The method of claim 2, wherein a highest priority is associated with first decision components associated with higher velocity vehicles, an intermediate priority is associated with second decision components that require a rule violation, and a lowest priority is associated with other types of decision components.

4. The method of claim 1, further comprising:
   determining whether the third set of actions is empty; and
   responsive to determining that the third set of actions is empty, adding a default action to the third set of actions.

5. The method of claim 1, wherein the action is one of to stop, to advance, or to proceed.

6. The method of claim 5, wherein controlling the AV to traverse the portion of the vehicle transportation network in accordance with the action includes:
   on a condition that the action is to stop, controlling the AV to be stationary;
   on a condition that the action is to advance, controlling the AV to traverse a defined cautionary distance in the vehicle transportation network at a defined cautionary rate; and
   on a condition that the action is to proceed, controlling the AV to traverse the vehicle transportation network in accordance with a previously identified vehicle control action.

7. The method of claim 1, wherein instantiating the first decision component instance includes:
   on a condition that identifying the distinct vehicle operational scenario includes identifying an intersection scenario, instantiating an intersection-decision component instance, wherein the intersection-decision component instance is an instance of an intersection-decision component modeling the intersection scenario;
   on a condition that identifying the distinct vehicle operational scenario includes identifying a pedestrian scenario, instantiating a pedestrian-decision component instance, wherein the pedestrian-decision component instance is an instance of a pedestrian-decision component modeling the pedestrian scenario; and
   on a condition that identifying the distinct vehicle operational scenario includes identifying a lane-change scenario, instantiating a lane-change-decision component instance, wherein the lane-change-decision component instance is an instance of a lane-change-decision component modeling the lane-change scenario.

8. The method of claim 1, wherein the state states factor relates to at least one of a first state of a sensor of the AV, a second state of an actuator of the AV, a third state of availability of a tele-operator, or a fourth state relating to an autonomy competence level of the AV.

9. An autonomous vehicle comprising:
   a processor configured to execute instructions stored on a non-transitory computer readable medium to:
     instantiating respective decision component instances by instructions to:
       responsive to identifying a distinct vehicle operational of an intersection scenario, instantiate an intersection-decision component instance,
         wherein the intersection-decision component instance is an instance of an intersection- decision component modeling the intersection scenario, and
         wherein the intersection-decision component instance provides a first solution that is obtained offline in a first idealized situation that is decoupled from a current context of the autonomous vehicle;
       responsive to identifying a distinct vehicle operational of a pedestrian scenario, instantiate a pedestrian-decision component instance,
         wherein the pedestrian-decision component instance is an instance of a pedestrian-decision component modeling the pedestrian scenario, and
         wherein the instantiate a pedestrian-decision component instance provides a second solution that is obtained offline in a second idealized situation that is decoupled from the current context of the autonomous vehicle; and
       responsive to identifying a distinct vehicle operational of a lane-change scenario, instantiating a lane-change-decision component instance,
         wherein the lane-change-decision component instance is an instance of a lane-change-decision component modeling the lane-change scenario, and
         wherein the lane-change-decision component instance provides a third solution that is obtained offline in a third idealized situation that is decoupled from the current context of the autonomous vehicle;
     receive respective sets of candidate actions from the respective decision component instances, wherein each decision component instance is an instance of a decision component modeling a distinct vehicle operational scenario;
     identify an intersecting set of actions as an intersection of the respective sets of candidate actions;
     select an action from the intersecting set of actions based on respective priorities of the respective decision components;
     determine whether a current value of a state factor of the current context of the AV conflicts with a value of the state factor required for the action;
     response to determining that the current value of the state factor conflicts with the value required for the action, convert the action to another action; and
     control the autonomous vehicle to traverse a portion of a vehicle transportation network based on the action.

10. The autonomous vehicle of claim 9, wherein a highest priority is associated with first decision components associated with higher velocity external objects, an intermediate priority is associated with second decision components that require a rule violation, and a lowest priority is associated with other types of decision components.

11. The autonomous vehicle of claim 9, wherein the processor is further configured to execute instructions stored in the non-transitory computer readable medium to:

responsive to determining that the intersecting set of actions is empty, add a default action to the intersecting set of actions.

12. The autonomous vehicle of claim 11, wherein the action is selected according to a Partially Observable Markov Decision Process model.

13. A method for use in traversing a vehicle transportation network by an autonomous vehicle, the method comprising:

receiving a first set of candidate actions from a first decision component instance and a second set of candidate actions from a second decision component instance, wherein the first decision component instance is a first instance of a first decision component modeling a first distinct vehicle operational scenario, wherein the first decision component instance provides a first solution to the first distinct vehicle operational scenario, wherein the first solution is obtained offline in a first idealized situation that is decoupled from a current context of an autonomous vehicle (AV), wherein the second decision component instance is a second instance of a second decision component modeling a second distinct vehicle operational scenario, wherein the second decision component instance provides a second solution to the second distinct vehicle operational scenario, and wherein the second solution is obtained offline in a second idealized situation that is decoupled from the current context of the AV;

identifying an intersecting set of actions as an intersection of the first set of candidate actions and the second set of candidate actions;

determining whether the intersecting set of actions is empty;

responsive to determining that the intersecting set of actions is empty, adding a default action to the intersecting set of actions;

selecting the action is conditioned on a context of state vectors associated with the autonomous vehicle, wherein selecting the action comprises:

determining whether a current value of a state factor of the current context of the AV conflicts with a value of the state factor required for the action; and response to determining that the current value of the state factor conflicts with the value required for the action, converting the action to another action; and controlling the autonomous vehicle to traverse a portion of the vehicle transportation network based on the action.

14. The method of claim 13, wherein selecting the action is conditioned on a first priority of the first decision component and a second priority of the second decision component.

15. The method of claim 13, wherein the action is at least one of to stop, to advance, to proceed, to pass-on-left, or to pass-on-right.

16. The method of claim 4, wherein the default action is a stop action.

17. The method of claim 13, further comprising:

determining whether the intersecting set of actions is empty; and responsive to determining that the intersecting set of actions is empty, adding a default action to the intersecting set of actions.

* * * * *